US012679293B2

(12) United States Patent
Norimatsu et al.

(10) Patent No.: US 12,679,293 B2
(45) Date of Patent: Jul. 14, 2026

(54) POWER SUPPLY SYSTEM AND ELECTRONIC CONTROL DEVICE

(71) Applicant: Hitachi Astemo, Ltd., Ibaraki (JP)

(72) Inventors: Takayasu Norimatsu, Tokyo (JP); Kenji Kogo, Tokyo (JP); Koji Maeda, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 35 days.

(21) Appl. No.: 18/842,841

(22) PCT Filed: Jun. 7, 2023

(86) PCT No.: PCT/JP2023/021135
§ 371 (c)(1),
(2) Date: Aug. 30, 2024

(87) PCT Pub. No.: WO2023/248794
PCT Pub. Date: Dec. 28, 2023

(65) Prior Publication Data
US 2025/0178548 A1 Jun. 5, 2025

(30) Foreign Application Priority Data
Jun. 22, 2022 (JP) ................................. 2022-100467

(51) Int. Cl.
*B60R 16/00* (2006.01)
*B60R 16/023* (2006.01)
(Continued)

(52) U.S. Cl.
CPC ........ *B60R 16/0231* (2013.01); *B60R 16/033* (2013.01); *H02J 9/061* (2013.01)

(58) Field of Classification Search
CPC ..... B60R 16/0231; B60R 16/033; H02J 9/061
(Continued)

(56) References Cited

U.S. PATENT DOCUMENTS 10,861,663 B2 12/2020 Saito
11,351,940 B2 6/2022 Takahara
(Continued)

FOREIGN PATENT DOCUMENTS

JP 2004-338577 A 12/2004
JP 2019-142486 A 8/2019
(Continued)

OTHER PUBLICATIONS

International Search Report of PCT/JP2023/021135 dated Aug. 15, 2023.
(Continued)

*Primary Examiner* — Mahmoud S Ismail
(74) *Attorney, Agent, or Firm* — MATTINGLY & MALUR, PC

(57) ABSTRACT
A first switch circuit provided between a first control circuit and a first power supply interrupts supply of a first voltage to the first control circuit in a case where a voltage drop of the first voltage is equal to or greater than a threshold, a second switch circuit connected to a communication line used for communication between the first power supply and a second control circuit interrupts supply of the first voltage to the communication line in a case where the voltage drop of the first voltage is equal to or greater than a threshold, and a power supply switch circuit connected to the first control circuit and the communication line switches a supply source of a power supply voltage to the first control circuit from the first power supply to the second power supply.

5 Claims, 16 Drawing Sheets

(51) Int. Cl.
  *B60R 16/033* (2006.01)
  *H02J 9/06* (2006.01)

(58) Field of Classification Search
  USPC .......................................................... 701/1
  See application file for complete search history.

(56) References Cited

U.S. PATENT DOCUMENTS

| | | | |
|---|---|---|---|
| 11,618,462 B2 | 4/2023 | Komatsu et al. | |
| 2005/0035656 A1 | 2/2005 | Kuramochi et al. | |
| 2005/0052081 A1* | 3/2005 | Sayama | H02J 1/14 |
| | | | 307/10.1 |
| 2015/0210232 A1* | 7/2015 | Kanzaki | H02H 7/18 |
| | | | 701/36 |
| 2019/0115175 A1* | 4/2019 | Saito | H02J 9/061 |
| 2020/0136427 A1* | 4/2020 | Heinrich | G06F 1/263 |
| 2021/0237670 A1 | 8/2021 | Takahara | |
| 2022/0017108 A1 | 1/2022 | Komatsu et al. | |
| 2023/0166678 A1 | 6/2023 | Kogo et al. | |
| 2024/0092197 A1* | 3/2024 | Huang | B60R 16/03 |

FOREIGN PATENT DOCUMENTS

| | | |
|---|---|---|
| JP | 2021-125928 A | 8/2021 |
| WO | 2018/008360 A1 | 1/2018 |
| WO | 2020/137091 A1 | 7/2020 |
| WO | 2021/220564 A1 | 11/2021 |

OTHER PUBLICATIONS

Written Opinion of the International Search Authority of PCT/JP2023/021135 dated Aug. 15, 2023.

* cited by examiner

302

907

907A

907B

POWER SUPPLY SYSTEM AND ELECTRONIC CONTROL DEVICE

TECHNICAL FIELD

The present invention relates to a power supply system and an electronic control device using a technology of superimposing a power supply on a communication signal.

BACKGROUND ART

In order to cope with electrification and automated driving of an automobile, the number of in-vehicle electronic control components such as sensors tends to increase, and an in-vehicle communication network becomes complicated. When the complexity of the in-vehicle communication network increases, there are concerns about an increase in cost due to an increase in the number of communication cables and an increase in cost due to an increase in assembly difficulty. Therefore, it has been proposed to shift an in-vehicle electronic control unit (ECU) architecture from a domain type to a zone type. The zone architecture introduces fast communication and routing to simplify the in-vehicle communication network.

In addition, in the automated driving, "Fail operational" (continuation of operation at the time of failure) that enables continuation of driving even if one component breaks down is required, and thus, basically, the power supply and the communication are made redundant. In the redundancy of the power supply, a main power supply and a sub power supply are provided, and the main power supply is switched to the sub power supply when the main power supply is broken. One power supply is not always used, and a double number of power supply harnesses is required due to redundancy (see Patent Literature 1).

An increase in power supply harnesses leads to an increase in component cost, an increase in vehicle weight, and an increase in assembly cost. A method of using a power supply used for another application as a redundant power supply is also conceivable, but the power supply voltages may be different from each other, and the operation cannot be guaranteed for both.

CITATION LIST

Patent Literature

Patent Literature 1: JP 2019-142486 A

SUMMARY OF INVENTION

Technical Problem

In the technique described in Patent Literature 1, an increase in the power supplies and an increase in the power supply harnesses are expected due to the power supply redundancy, and there are problems of an increase in vehicle weight, an increase in component cost, and an increase in assembly cost.

The present invention has been made in view of the above circumstances, and an object of the present invention is to reduce power supply harnesses that are to increase with power supply redundancy in a system that performs power supply redundancy.

Solution to Problem

In order to solve the above problem, a power supply system according to an aspect of the present invention includes: a first control circuit; a first power supply that outputs a first voltage supplied to the first control circuit as a power supply voltage; a first switch circuit that is connected to the first power supply and the first control circuit and interrupts power supply of the first voltage to the first control circuit; a second switch circuit that is connected to a communication line used for communication between the first power supply and a second control circuit and interrupts supply of the first voltage to the communication line; a second power supply that outputs a second voltage supplied to the second control circuit as a power supply voltage; and a power supply switch circuit that is connected to the first control circuit and the communication line and supplies the second voltage to the first control circuit via the communication line when the supply of the first voltage to the first control circuit is interrupted by the first switch circuit. Power supply of the first voltage to the second control circuit and power supply of the second voltage to the first control circuit are bidirectional power transmission using the communication line.

The first switch circuit interrupts the supply of the first voltage to the first control circuit in a case where a voltage drop of the first voltage is equal to or greater than a threshold, the second switch circuit interrupts the supply of the first voltage to the communication line in a case where the voltage drop of the first voltage is equal to or greater than a threshold, and the power supply switch circuit switches a supply source of the power supply voltage to the first control circuit from the first power supply to the second power supply.

Advantageous Effects of Invention

According to at least an aspect of the present invention, it is possible to realize power supply redundancy without increasing the power supply harnesses.

Problems, configurations, and effects other than those described above will be clarified by the following description of embodiments.

DESCRIPTION OF EMBODIMENTS

Hereinafter, examples of modes for carrying out the present invention (hereinafter, referred to as "embodiments") will be described with reference to the accompanying drawings. In the present specification and the accompanying drawings, the same components or components having substantially the same functions are denoted by the same reference signs, and redundant description is omitted.

<Conventional Power Supply System>

Before describing a power supply system according to an embodiment of the present invention, an example of power supply redundancy of a conventional power supply system will be described with reference to FIG. 1.

Figure 1:
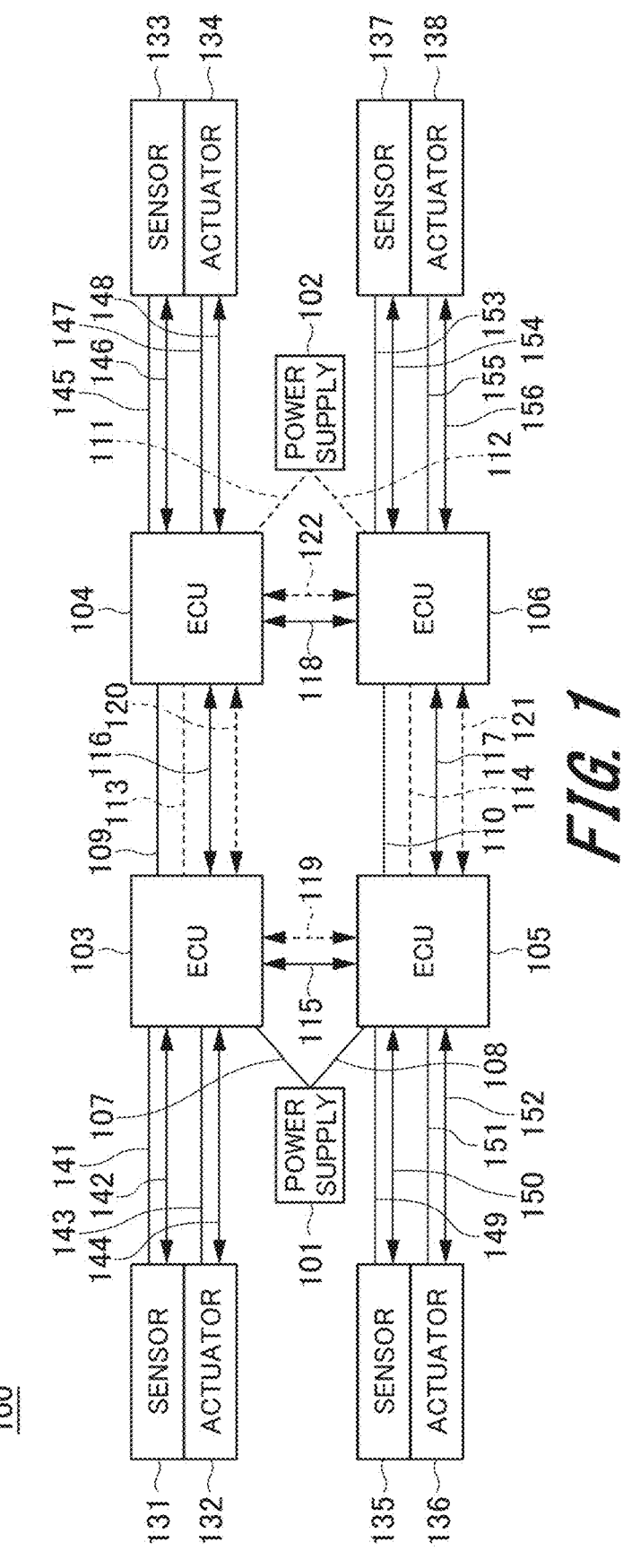
FIG. 1 is a system configuration diagram illustrating an example of power supply redundancy of a conventional power supply system.

FIG. 1 is a system configuration diagram illustrating an example of power supply redundancy of a conventional power supply system. The power supply system 100 illustrated in FIG. 1 has a configuration in which ECUs 103 to 106 are connected in a ring type in a zone architecture, and is an example in which power and communication are made redundant without using a power supply superimposition technology. A power supply 101 and a power supply 102 are redundant power supplies, and power supply (power) is supplied from the power supply 101 to the ECUs 103 to 106 only when the power supply 102 fails.

The power supply 101 supplies power to the ECU 103 via a power supply harness 107 and supplies power to the ECU 105 via a power supply harness 108. Further, the power supply 101 supplies power from the ECU 103 to the ECU 104 via a power supply harness 109, and supplies power from the ECU 105 to the ECU 106 via a power supply harness 110.

When the power supply 101 fails, the power supply 102 supplies power to the ECU 104 via a power supply harness 111 and to the ECU 106 via a power supply harness 112. Further, the power supply 102 supplies power from the ECU 104 to the ECU 103 via a power supply harness 113, and supplies power from the ECU 106 to the ECU 105 via a power supply harness 114.

The ECUs 103 to 106 are connected to each other by a redundant communication line, and communication is also redundant. The ECU 103 and the ECU 104 communicate with each other via a communication line 116 and a communication line 120. The ECU 103 and the ECU 105 communicate with each other via a communication line 115 and a communication line 119. The ECU 104 and the ECU 106 communicate with each other via a communication line 118 and a communication line 122. The ECU 105 and the ECU 106 communicate with each other via a communication line 117 and a communication line 121.

The ECU 103 supplies power to a sensor 131 via a power supply line 141, and performs control and data transmission/reception to/from the sensor 131 via a communication line 142. In addition, the ECU 103 supplies power to an actuator 132 via a power supply line 143, and performs control and data transmission/reception to/from the actuator 132 via a communication line 144.

The ECU 104 supplies power to a sensor 133 via a power supply line 145, and performs control and data transmission/reception to/from the sensor 133 via a communication line 146. In addition, the ECU 104 supplies power to an actuator 134 via a power supply line 147, and performs control and data transmission/reception to/from the actuator 134 via a communication line 148.

The ECU 105 supplies power to a sensor 135 via a power supply line 149, and performs control and data transmission/reception to/from the sensor 135 via a communication line 150. In addition, the ECU 105 supplies power to an actuator 136 via a power supply line 151, and performs control and data transmission/reception to/from the actuator 136 via a communication line 152.

The ECU 106 supplies power to a sensor 137 via a power supply line 153, and performs control and data transmission/reception to/from the sensor 137 via a communication line 154. In addition, the ECU 106 supplies power to an actuator 138 via a power supply line 155, and performs control and data transmission/reception to/from the actuator 138 via a communication line 156.

First Embodiment

Next, a configuration of a power supply system according to a first embodiment of the present invention will be described with reference to FIG. 2. The present invention makes it possible to achieve power supply redundancy without increasing the number of power supply harnesses, for example, by achieving power supply redundancy through communication lines using a power supply superimposition technology for ECUs used for zone architecture.

Since communication lines connect all ECUS, each power supply manages some ECUs and connects power supply harnesses, and supplying power from a power supply not directly connected to an ECU by a power supply harness at the time of failure is performed using communication lines. When each power supply fails, supplying power is switches to from the communication lines. However, since the source of power supply varies depending on the failed power supply, the power supply switcher capable of bidirectionally supplying power is used to perform power supply redundancy by the communication lines.

[Configuration of Power Supply System]

Figure 2:
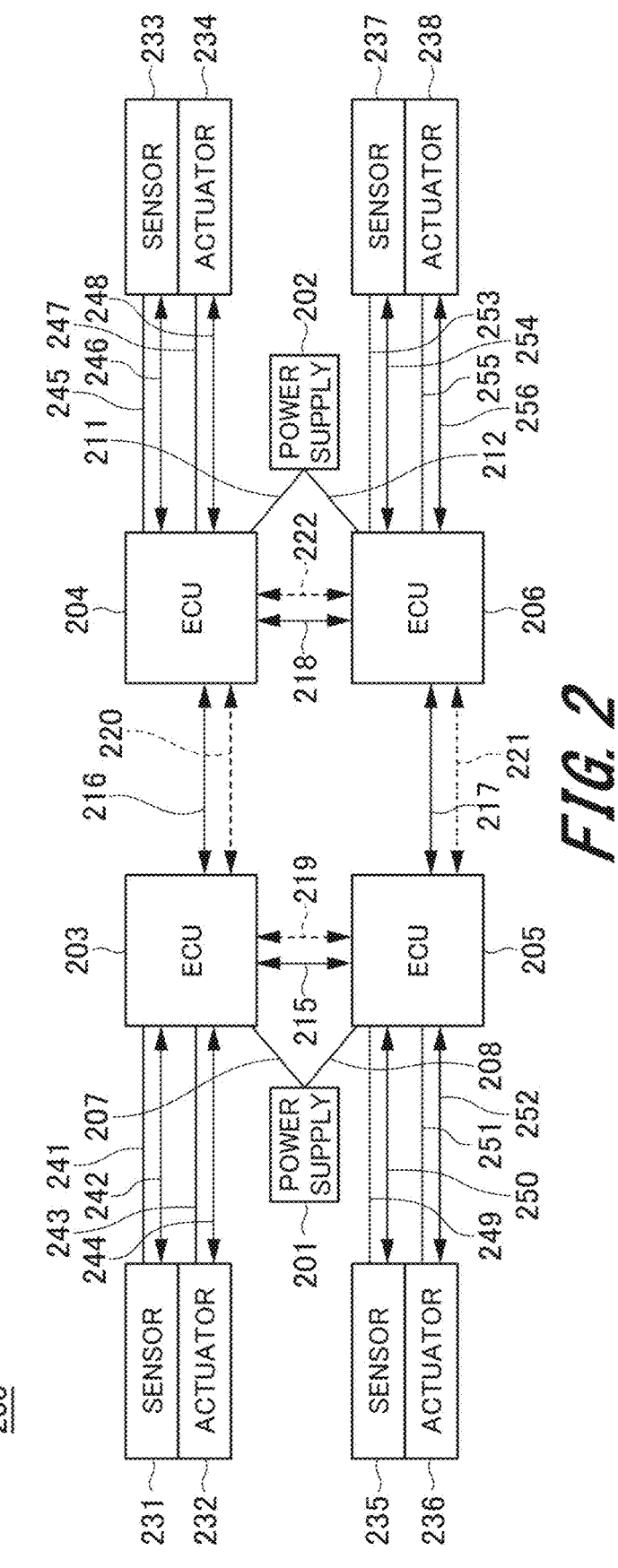
FIG. 2 is a system configuration diagram illustrating an example of power supply redundancy of a power supply system according to a first embodiment of the present invention.

FIG. 2 is a system configuration diagram illustrating an example of power supply redundancy of the power supply system according to the first embodiment. A power supply system 200 illustrated in FIG. 2 is an example in which power supply redundancy is performed by communication lines using a power supply superimposition technology and power supply harnesses are reduced. In the present embodiment, a ring-type network architecture is used for the power supply system 200. In the power supply system 200, the power supply harnesses 109 and 113 corresponding to between an ECU 203 and an ECU 204 and the power supply harnesses 110 and 114 corresponding to between an ECU 205 and an ECU 206 are removed from the power supply system 100 of FIG. 1. Instead, power supply superimposition for transmitting power and communication is performed on a communication line 216 connecting the ECU 203 and the ECU 204 and a communication line 217 connecting the ECU 205 and the ECU 206, thereby realizing power supply redundancy.

The power supply system 200 includes a power supply 201, a power supply 202, the ECU 203, the ECU 204, the ECU 205, the ECU 206, power supply harnesses 207 to 208, power supply harnesses 211 to 212, communication lines 215 to 218 indicated by solid lines, and communication lines 219 to 222 indicated by broken lines. The communication lines 215 to 218 indicated by solid lines are power supply superimposing communication lines. In addition, the communication lines 219 to 222 indicated by broken lines are communication lines for communication. However, the same power supply superimposing communication line as the communication lines 215 to 218 may be used as the communication lines 219 to 222.

The power supply 201 supplies power to the ECU 203 via the power supply harness 207 and supplies power to the ECU 205 via the power supply harness 208. In addition, the power supply 202 supplies power to the ECU 204 via the power supply harness 211 and supplies power to the ECU 206 via the power supply harness 212.

The ECU 203 and the ECU 204 can supply power to each other by superimposing power via the communication line 216. In a case where the power supply 201 fails, the power of the power supply 202 is supplied from the ECU 204 to the ECU 203 via the communication line 216. Conversely, when the power supply 202 fails, the power of the power supply 201 is supplied from the ECU 203 to the ECU 204 via the communication line 216.

In addition, it similarly applies to power transmission between the ECU 205 and the ECU 206, and the ECU 205 and the ECU 206 can supply power to each other by superimposing power via the communication line 217. In a case where the power supply 201 fails, the power of the power supply 202 is supplied from the ECU 206 to the ECU 205 via the communication line 217. Conversely, when the power supply 202 fails, the power of the power supply 201 is supplied from the ECU 205 to the ECU 206 via the communication line 217.

The ECU 203 performs redundant communication with the ECU 204 via the communication line 216 and the communication line 220, performs redundant communication with the ECU 205 via the communication line 215 and the communication line 219, and exchanges data. Furthermore, the ECU 203 supplies power to a sensor 231 via a power supply line 241, and performs control and data transmission/reception via a communication line 242. Further, the ECU 203 supplies power to an actuator 232 via a power supply line 243, and performs control and data transmission/reception via a communication line 244.

The ECU 204 performs redundant communication with the ECU 203 via the communication line 216 and the communication line 220, performs redundant communication with the ECU 206 via the communication line 218 and the communication line 222, and exchanges data. Furthermore, the ECU 204 supplies power to a sensor 233 via a power supply line 245, and performs control and data transmission/reception via a communication line 246. Further, the ECU 204 supplies power to an actuator 234 via a power supply line 247, and performs control and data transmission/reception via a communication line 248.

The ECU 205 performs redundant communication with the ECU 203 via the communication line 215 and the communication line 219, and performs redundant communication with the ECU 206 via the communication line 217 and the communication line 221, and exchanges data. Furthermore, the ECU 205 supplies power to a sensor 235 via a power supply line 249, and performs control and data transmission/reception via a communication line 250. Further, the ECU 205 supplies power to an actuator 236 via a power supply line 251, and performs control and data transmission/reception via a communication line 252.

The ECU 206 performs redundant communication with the ECU 204 via the communication line 218 and the communication line 222, performs redundant communication with the ECU 205 via the communication line 217 and the communication line 221, and exchanges data. Furthermore, the ECU 206 supplies power to a sensor 237 via a power supply line 253, and performs control and data transmission/reception via a communication line 254. Further, the ECU 206 supplies power to an actuator 238 via a power supply line 255, and performs control and data transmission/reception via a communication line 256.

Here, an example in which one sensor and one actuator are connected to each of the ECUs 203 to 206 has been described, but the numbers of sensors and actuators are not limited to one. Even when the numbers of sensors and actuators increase or decrease, the power supply redundancy configuration of the power supply system 200 is similar.

[Configuration of Electronic Control Device]

Next, a configuration of an electronic control device (ECU) included in the power supply system 200 will be described with reference to FIG. 3.

Figure 3:
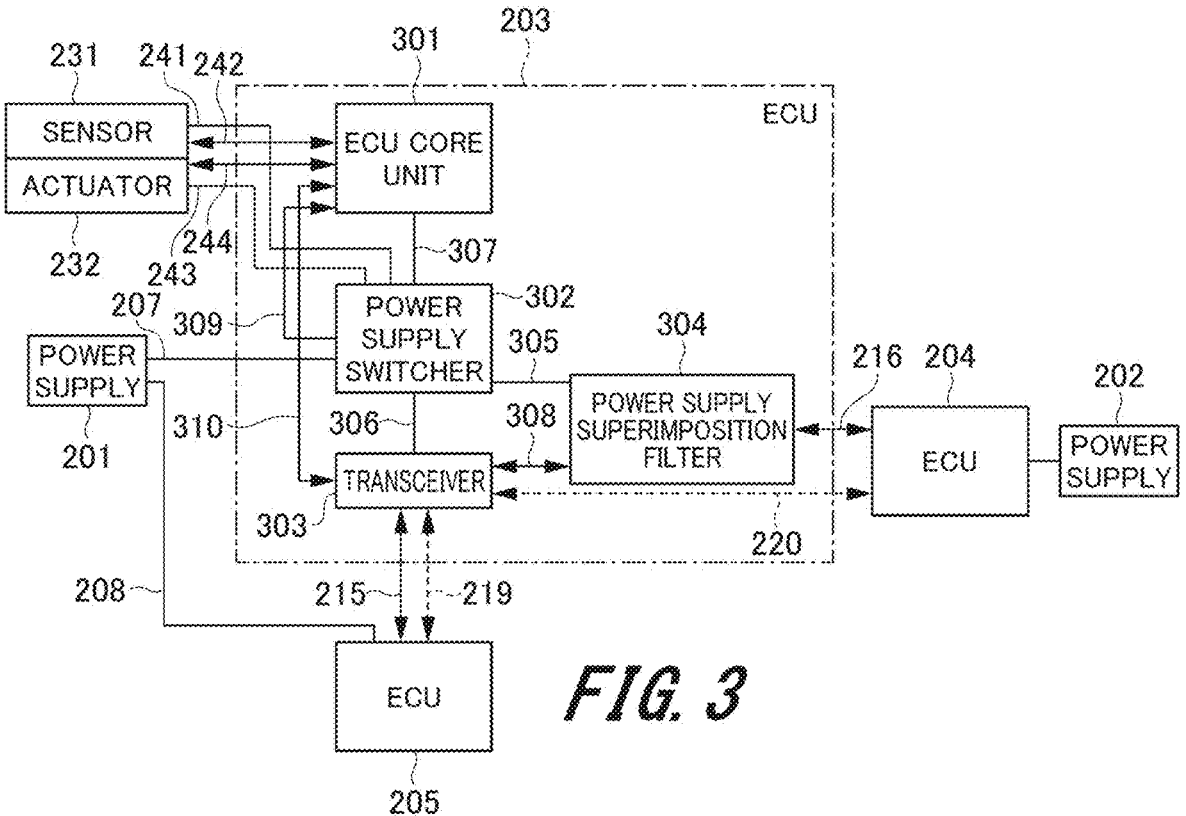
FIG. 3 is a block diagram illustrating a configuration example of an electronic control device included in the power supply system according to the first embodiment of the present invention.

FIG. 3 is a block diagram illustrating a configuration example of an electronic control device (ECU 203) included in the power supply system 200. The ECU 204, the ECU 205, and the ECU 206 also have configurations similar to the ECU 203. The ECU 203 includes an ECU core unit 301 that performs control and information processing, a power supply switcher 302, a transceiver 303, and a power supply superimposition filter 304.

The power supply superimposition filter 304 is connected to the ECU 204 via the communication line 216, and exchanges a communication signal or a communication signal on which power is superimposed. In addition, the power supply superimposition filter 304 is connected to the power supply switcher 302 via a power supply line 305 and is connected to the transceiver 303 via a communication line 308. In the power supply superimposition filter 304, only direct current (DC) power and power having a frequency near DC pass between the communication line 216 and the power supply line 305, and only a high-frequency communication signal passes between the communication line 216 and the communication line 308. The power supply superimposition filter 304 is configured using, for example, power over datalines (PoDL), and separates and superimposes a communication signal and power. In the PoDL, direct current (DC) power is superimposed on a signal (differential) and transmitted using a pair of twisted cables.

The power supply switcher 302 receives the power of the power supply 201 supplied via the power supply harness 207 and the power of the power supply 202 supplied via the power supply line 305. Then, the power supply switcher 302 internally monitors the voltage passing through the power supply harness 207 and the voltage passing through the power supply line 305, and determines and switches which voltage is connected to the output. Accordingly, the power supply switcher 302 supplies power to the ECU core unit 301 via a power supply line 307, to the transceiver 303 via a power supply line 306, to the sensor 231 via the power supply line 241, and to the actuator 232 via the power supply line 243.

In a case where the power supply 201 is normal, the power supply switcher 302 supplies power from the power supply harness 207 to the ECU core unit 301, the transceiver 303, the sensor 231, and the actuator 232. On the other hand, in a case where the power supply 201 has failed and the power supply 202 is normal, the power supply switcher 302 supplies the power transmitted through the power supply line 305 to the ECU core unit 301, the transceiver 303, the sensor 231, and the actuator 232. In addition, since the power supply switcher 302 can obtain information indicating that the power supply 201 has failed (power supply failure information), the power supply failure information can be transmitted to the ECU core unit 301 via a communication line 309 to share the power supply failure information with other ECUs.

As described above, when the power supply of the first voltage from the first power supply (power supply 201) to the first control circuit (ECU core unit 301) is interrupted, the first control circuit notifies an external device (for example, another ECU) that the first power supply is abnormal. As a result, for example, another in-vehicle ECU can perform appropriate control such as operation continuation control in response to the abnormality of the first power supply.

The transceiver 303 communicates with the ECU 204 via the communication line 216 via the communication line 308 and the power supply superimposition filter 304 and the communication line 220. In addition, the transceiver 303 communicates with the ECU 205 via the communication line 215 and the communication line 219. Then, the transceiver 303 exchanges a transmission signal and a reception signal for another ECU with the ECU core unit 301 via a communication line 310.

The ECU core unit 301 controls the transceiver 303 via the communication line 310, and exchanges data with the ECU 204, the ECU 205, and the ECU 206 (FIG. 2) via the transceiver 303. The ECU 203 and the ECU 206 can communicate with each other via another ECU 204 or ECU 205 by designating a transmission source and a transmission destination to each other by routing. In addition, the ECU core unit 301 performs control and data transmission/reception with respect to the sensor 231 and the actuator 232, and performs data processing.

For example, the ECU core unit 301 may include a memory (ROM and RAM) and a nonvolatile storage in addition to a processor not illustrated. For example, a processor such as a central processing unit (CPU) or a micro-processing unit (MPU) can be used as the processor of the ECU core unit 301. The processor executes the computer program stored in the ROM or the nonvolatile storage, thereby implementing the function of the ECU core unit in the embodiment of the present invention.

[Configuration of Power Supply Switcher]

Next, a configuration of the power supply switcher included in the electronic control device (ECU) according to the present embodiment will be described with reference to FIG. 4.

Figure 4:
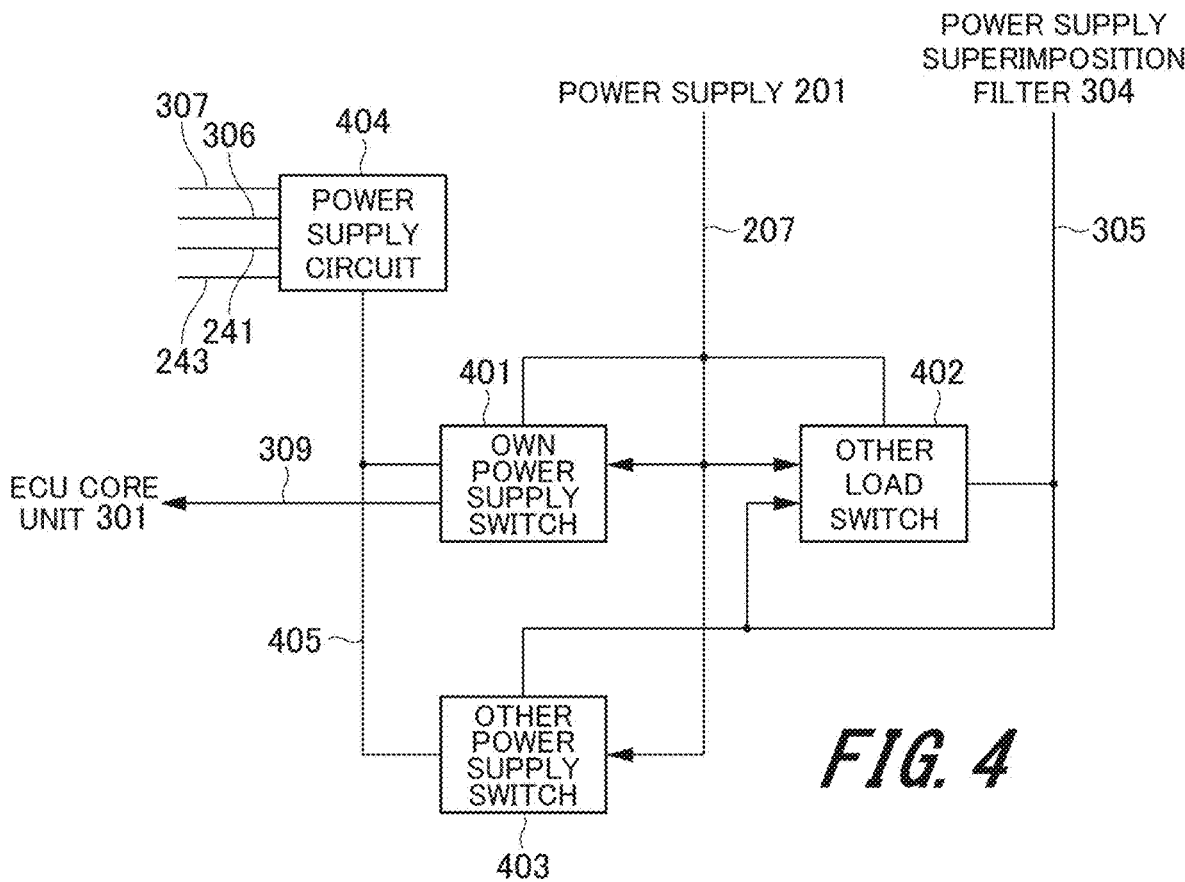
FIG. 4 is a block diagram illustrating a configuration example of a power supply switcher included in the electronic control device according to the first embodiment of the present invention.

FIG. 4 is a block diagram illustrating a configuration example of the power supply switcher 302 included in the ECU 203. The power supply switcher 302 includes an own power supply switch 401, an other load switch 402, an other power supply switch 403, and a power supply circuit 404. A solid line without an arrow connected to the own power supply switch 401, the other load switch 402, and the other power supply switch 403 represents a power supply application of power, and a solid line with an arrow represents a power control application.

The own power supply switch 401 is a circuit that monitors the voltage of the power supply harness 207, turns on the internal switch when the voltage is equal to or higher than a preset threshold voltage, conducts the power supply harness 207 and a power supply line 405, and supplies power to the power supply circuit 404 through the power supply line 405. When the voltage of the power supply harness 207 falls below the threshold voltage, the own power supply switch 401 turns off the internal switch to cut off the connection between the power supply harness 207 and the power supply line 405. Further, the own power supply switch 401 outputs a signal based on the comparison result between the voltage from the power supply harness 207 and the threshold voltage to the ECU core unit 301 via the communication line 309. This signal corresponds to the power supply failure information described in FIG. 3.

The other load switch 402 is a circuit that monitors the voltages of the power supply harness 207 and the power supply line 305, turns on the internal switch when both the voltages are equal to or higher than a preset threshold voltage, and conducts the power supply harness 207 and the power supply line 305. When either the voltage of the power supply harness 207 or the voltage of the power supply line 305 falls below the threshold voltage, the other load switch 402 turns off the internal switch to cut off the connection between the power supply harness 207 and the power supply line 305.

The other power supply switch 403 is a circuit that monitors the voltage of the power supply harness 207, turns off the internal switch when the voltage is equal to or higher than a preset threshold voltage, cut off the connection between the power supply line 305 and the power supply line 405, and does not supply power to the power supply circuit 404. When the voltage of the power supply harness 207 falls below the threshold voltage, the other power supply switch 403 conducts between the power supply line 305 and the power supply line 405, and supplies power to the power supply circuit 404 through the power supply line 405.

The power supply circuit 404 converts the voltage of the power transmitted from the power supply line 405 according to the supply destination, and supplies the power via each of the power supply line 306, the power supply line 307, the power supply line 241, and the power supply line 243.

[First Example of Each Switch]

Here, a first example of the own power supply switch, the other load switch, and the other power supply switch constituting the power supply switcher 302 in the present embodiment will be described with reference to FIG. 5.

Figure 5:
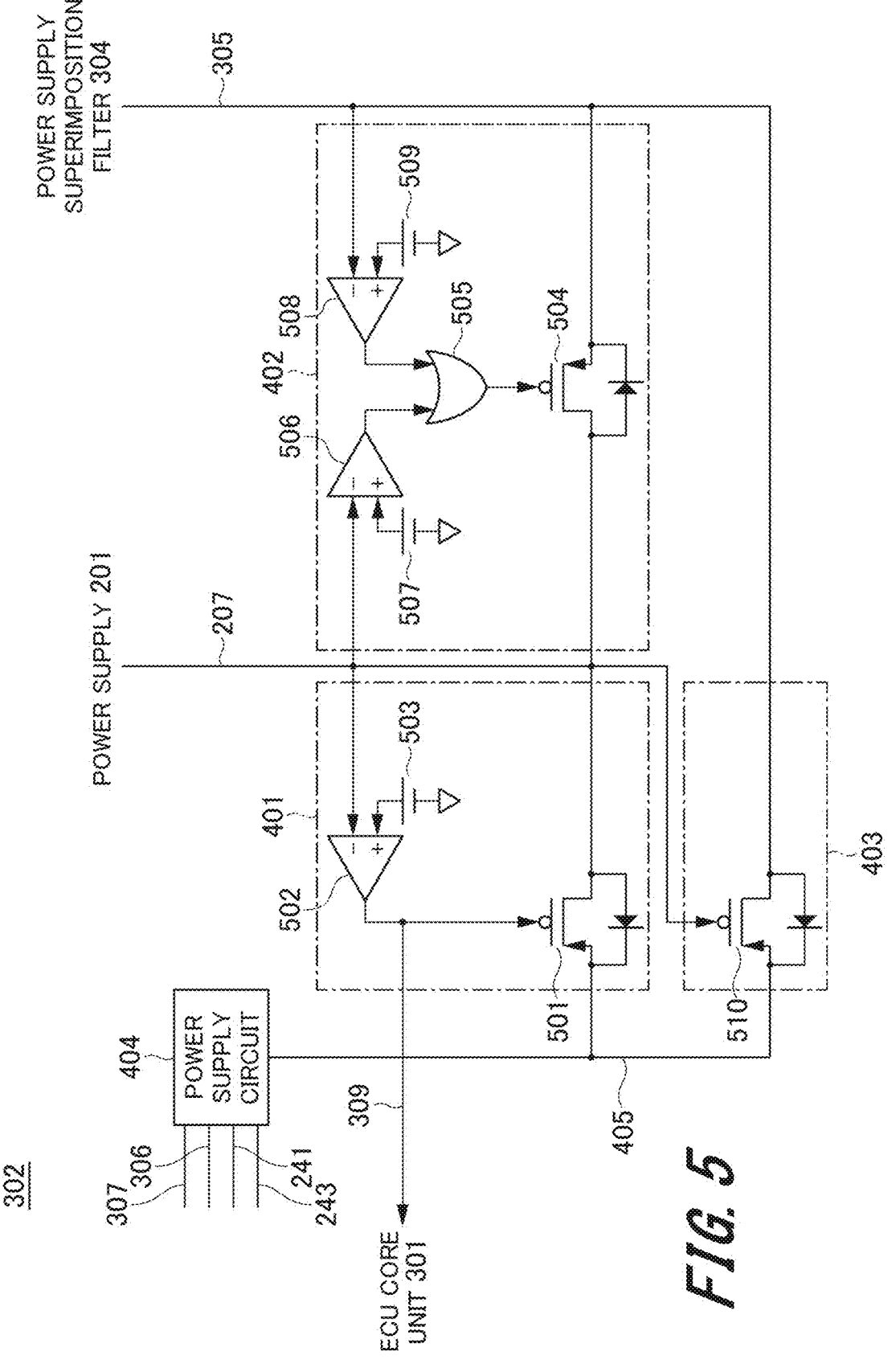
FIG. 5 is a circuit diagram illustrating a first example of an own power supply switch, an other load switch, and an other power supply switch constituting the power supply switcher according to the first embodiment of the present invention.

FIG. 5 is a circuit diagram illustrating the first example of the own power supply switch 401, the other load switch 402, and the other power supply switch 403 constituting the power supply switcher 302. The own power supply switch 401 includes a metal oxide semiconductor field-effect transistor (MOSFET) 501, a comparator 502, and a threshold voltage source 503.

The MOSFET 501 is an example of a P-type MOSFET, and in a high-voltage type, a diode is connected between a drain and a source. It similarly applies to the MOSFETs used in the following switches.

The comparator 502 compares the voltage from the power supply harness 207 with the threshold voltage of the threshold voltage source 503, and sets the output to the Low level when the voltage from the power supply harness 207 is equal to or higher than the threshold voltage, turns on the MOSFET 501, and conducts the power supply harness 207 and the power supply line 405. On the other hand, if the voltage from the power supply harness 207 is lower than the threshold voltage, the comparator 502 sets the output to the High level, turns off the MOSFET 501, and cuts off the connection between the power supply harness 207 and the power supply line 405. The output of the comparator 502 is transmitted to the ECU core unit 301 via the communication line 309.

The other load switch 402 includes a MOSFET 504, an OR circuit 505, a comparator 506, a threshold voltage source 507, a comparator 508, and a threshold voltage source 509. The comparator 506 compares the voltage of the power supply 201 from the power supply harness 207 with the threshold voltage of the threshold voltage source 507, and sets the output to the Low level when the voltage from the power supply harness 207 is equal to or higher than the threshold voltage, and conversely sets the output to the High level when the voltage from the power supply harness 207 is lower than the threshold voltage.

The comparator 508 compares the voltage of the power supply 202 from the power supply line 305 with the threshold voltage of the threshold voltage source 509, and sets the output to the Low level when the voltage from the power supply line 305 is equal to or higher than the threshold voltage, and conversely sets the output to the High level when the voltage from the power supply line 305 is lower than the threshold voltage.

The OR circuit 505 is a logical sum circuit that sets its own output to the High level when either the output voltage of the comparator 506 or the output voltage of the comparator 508 is at the High level, and sets its own output to the Low level when both the output voltages are at the Low level.

The MOSFET 504 is turned on when the output of the OR circuit 505 is at the Low level, and conducts the power supply harness 207 and the power supply line 305. On the other hand, the MOSFET 504 is turned off when the output of the OR circuit 505 is at the High level, and cuts off the connection between the power supply harness 207 and the power supply line 305.

The other power supply switch 403 includes only a MOSFET 510. Of course, a comparator may be used for the other power supply switch 403, similarly to the own power supply switch 401. Only when the voltage of the power supply harness 207 is lower than the voltage necessary for switching the MOSFET 510 with respect to the voltage of the power supply line 405 (the source-gate voltage is lower than the threshold voltage), the MOSFET 510 is turned on, and the power supply line 405 and the power supply line 305 are conducted.

In the initial state, since the voltage of the power supply line 405 starts in a low state, the MOSFET 501 and the MOSFET 510 are turned off. For example, the initial state is at the time of power supply activation, at the time of activation of the ECU 203, at the time of activation of the automobile, or the like. Here, in the MOSFET 501, since the diode is connected between the drain and the source, when the voltage of the power supply harness 207 becomes higher than the threshold voltage of the diode, the power supply line 405 and the power supply harness 207 are conducted, and the value of the voltage of the power supply line 405 increases, so that the MOSFET 501 is also turned on. In addition, it similarly applies to a case where the power supply line 305 is started in a low voltage state, and the MOSFET 504 is initially turned off, but the power supply harness 207 and the power supply line 305 are conducted via a diode connected between the drain and source of the MOSFET 504, the voltage value of the power supply line 305 increases, and the MOSFET 504 is also turned on.

According to the power supply switcher having the above configuration, it is possible to switch the power supply passing through the power supply harness and the power supply passing through the communication line to a high speed and a low loss when the power supply fails.

[Second Example of Each Switch]

Next, a second example of the own power supply switch, the other load switch, and the other power supply switch constituting the power supply switcher 302 in the present embodiment will be described with reference to FIG. 6.

Figure 6:
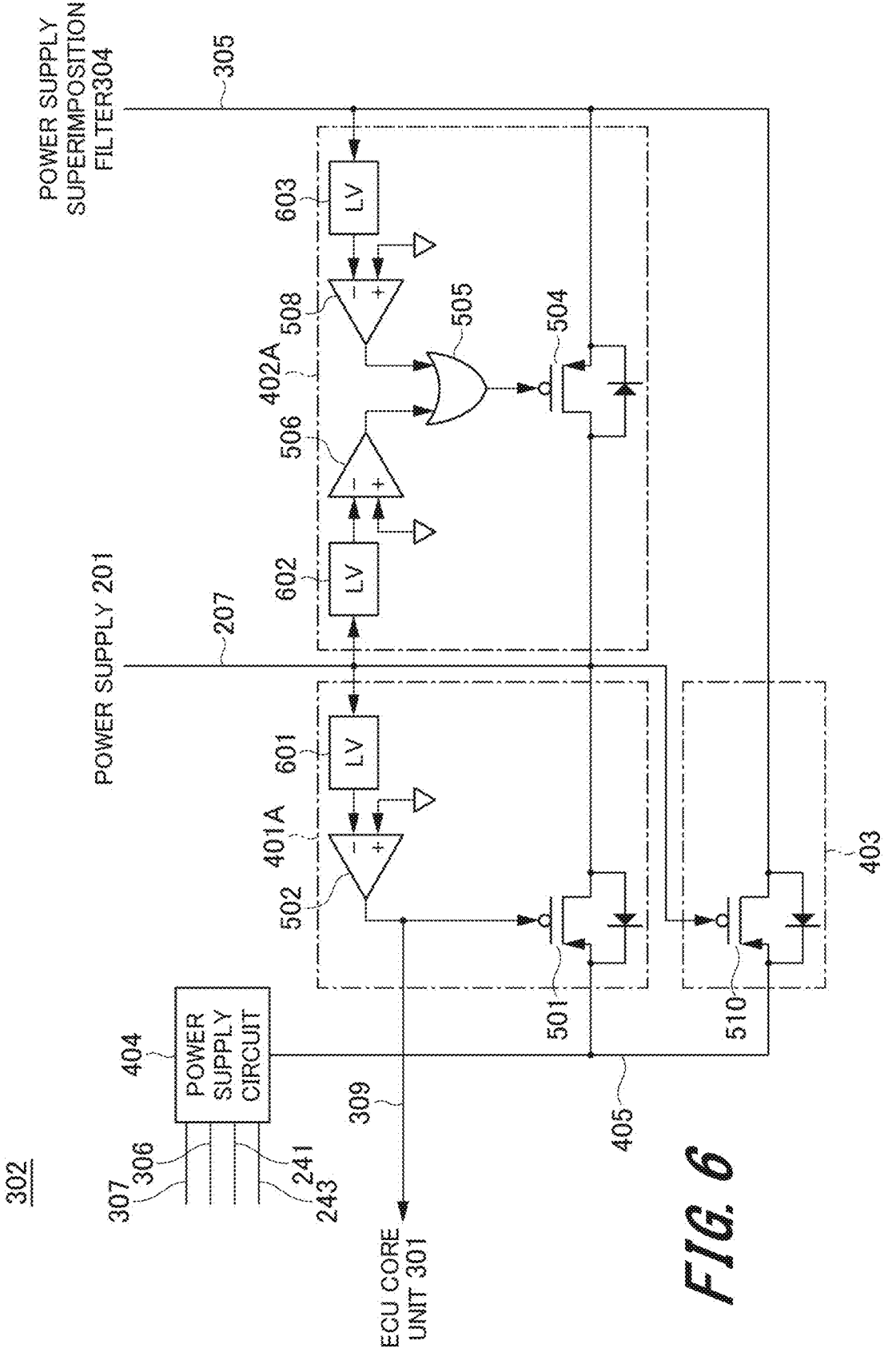
FIG. 6 is a circuit diagram illustrating a second example of an own power supply switch, an other load switch, and an other power supply switch constituting the power supply switcher according to the first embodiment of the present invention.

FIG. 6 is a circuit diagram illustrating the second example of an own power supply switch 401A, an other load switch 402A, and an other power supply switch 403 constituting the power supply switcher 302. The configuration of the power supply switcher 302 illustrated in FIG. 6 is different from the power supply switcher 302 of the first example illustrated in FIG. 5 in that a level shifter (denoted as "LV" in the drawing) is used instead of the threshold voltage source, and the operation thereof is substantially the same as that of the first example.

The own power supply switch 401A includes a MOSFET 501, a comparator 502, and a level shifter 601. The level shifter 601 shifts the voltage from the power supply harness 207 by a preset voltage and outputs the voltage to the comparator 502. The comparator 502 outputs the Low level when the output voltage of the level shifter 601 is positive, and outputs the High level when the output voltage is negative, thereby controlling ON/OFF of the MOSFET 501. At that time, the output of the comparator 502 is transmitted to the ECU core unit 301 via the communication line 309.

The other load switch 402A includes a MOSFET 504, an OR circuit 505, a comparator 506, a level shifter 602, a comparator 508, and a level shifter 603. The level shifter 602 shifts the voltage from the power supply harness 207 by a preset voltage and outputs the voltage to the comparator 506. The comparator 506 outputs the Low level when the output voltage of the level shifter 602 is positive, and outputs the High level when the output voltage is negative. The level shifter 603 shifts the voltage from the power supply line 305 by a preset voltage and outputs the voltage to the comparator 508. The comparator 508 outputs the Low level when the output voltage of the level shifter 603 is positive, and outputs the High level when the output voltage is negative.

The OR circuit 505 controls ON/OFF of the MOSFET 504 by setting the output to the High level when any of the output voltages of the comparator 506 and the comparator 508 is at the High level, and setting the output to the Low level when any of the output voltages is at the Low level.
[Third Example of Each Switch]

Next, a third example of the own power supply switch, the other load switch, and the other power supply switch constituting the power supply switcher 302 in the present embodiment will be described with reference to FIG. 7.

Figure 7:
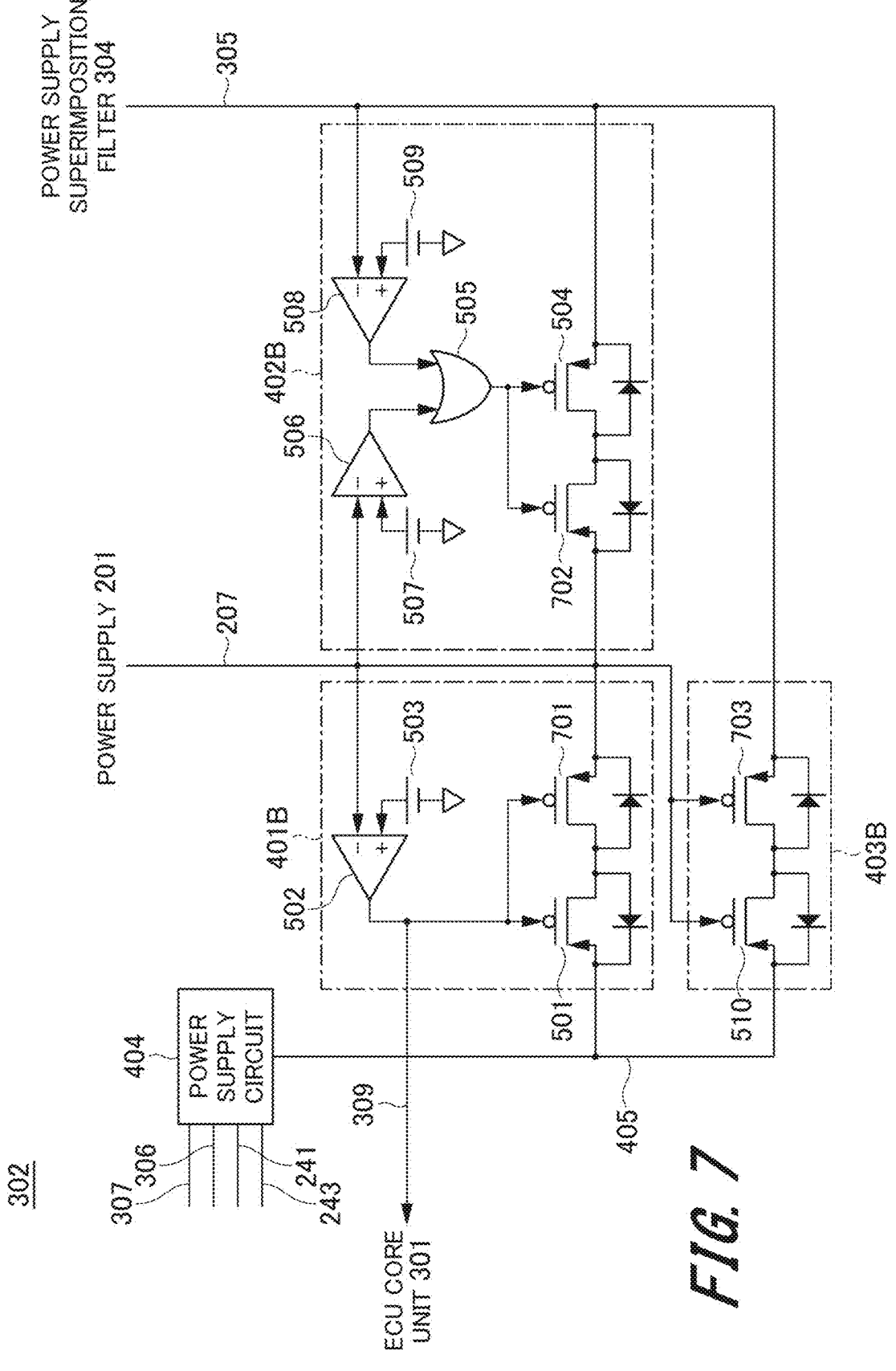
FIG. 7 is a circuit diagram illustrating a third example of an own power supply switch, an other load switch, and an other power supply switch constituting the power supply switcher according to the first embodiment of the present invention.

FIG. 7 is a circuit diagram illustrating the third example of an own power supply switch 401B, an other load switch 402B, and an other power supply switch 403B constituting the power supply switcher 302. The configuration of the power supply switcher 302 illustrated in FIG. 7 is different from the power supply switcher 302 of the first example illustrated in FIG. 5 in that each switch is provided with a countermeasure for preventing current leakage due to a ground fault in the power supply line 405, the power supply line 305, and the connection destination thereof.

A P-type MOSFET 701 having a drain-source direction opposite to that of the MOSFET 501 is added to the own power supply switch 401B. In the example of FIG. 7, the drain of the MOSFET 501 and the drain of the MOSFET 701 are connected, and the gate of the MOSFET 701 is connected to the output terminal of the comparator 502.

In addition, a MOSFET 702 having a drain-source direction opposite to that of the MOSFET 504 is added to the other load switch 402B. In the example of FIG. 7, the drain of the MOSFET 504 and the drain of the MOSFET 702 are connected, and the gate of the MOSFET 702 is connected to the output terminal of the OR circuit 505. Then, the source of the MOSFET 701 of the own power supply switch 401B and the source of the MOSFET 702 of the other load switch 402B are connected. In addition, the sources of the MOSFET 701 and the MOSFET 702 are connected to the power supply harness 207.

Further, a MOSFET 703 having a drain-source direction opposite to that of the MOSFET 510 is added to the other power supply switch 403B. In the example of FIG. 7, the drain of the MOSFET 510 and the drain of the MOSFET 703 are connected, the source of the MOSFET 703 is connected to the power supply line 305, and the gate of the MOSFET 703 is connected to the power supply harness 207.

In the MOSFET 701, the MOSFET 702, and the MOSFET 703, the orientations of the diodes are opposite to those of the original MOSFET 501, MOSFET 504, and MOSFET 510. The occurrence of current leakage can be prevented by the diodes of the MOSFETs 701 to 703.

As described above, in the power supply switcher (power supply switcher 302) according to the present embodiment, the first switch circuit (own power supply switch 401B) includes the first switching element (MOSFET 501) that energizes between the first power supply (power supply 201) and the first control circuit (ECU core unit 301) when the voltage drop of the first voltage (voltage of the power supply 201) is smaller than the threshold, and the switching element (MOSFET 701) connected between the first power supply and the first control circuit in series with the first switching element and having the opposite polarity. In addition, the second switch circuit (other load switch 402B) includes the second switching element (MOSFET 504) that energizes between the first power supply and the communication line (communication line 216 (power supply line 305)) when the voltage drop of both the first voltage and the second voltage (voltage of power supply 202) is smaller than the threshold, and the switching element (MOSFET 702) connected between the first power supply and the communication line in series with the second switching element and having the opposite polarity. In addition, the power supply switch circuit (other power supply switch 403B) includes the third switching element (MOSFET 510) that energizes between the first control circuit and the communication line (communication line 216 (power supply line 305)) when the voltage drop of the first voltage is smaller than the threshold, and the switching element (MOSFET 703) connected between the first control circuit and the communication line in series with the third switching element and having the opposite polarity.
[Fourth Example of Each Switch]

Next, a fourth example of the own power supply switch, the other load switch, and the other power supply switch constituting the power supply switcher 302 in the present embodiment will be described with reference to FIG. 8.

Figure 8:
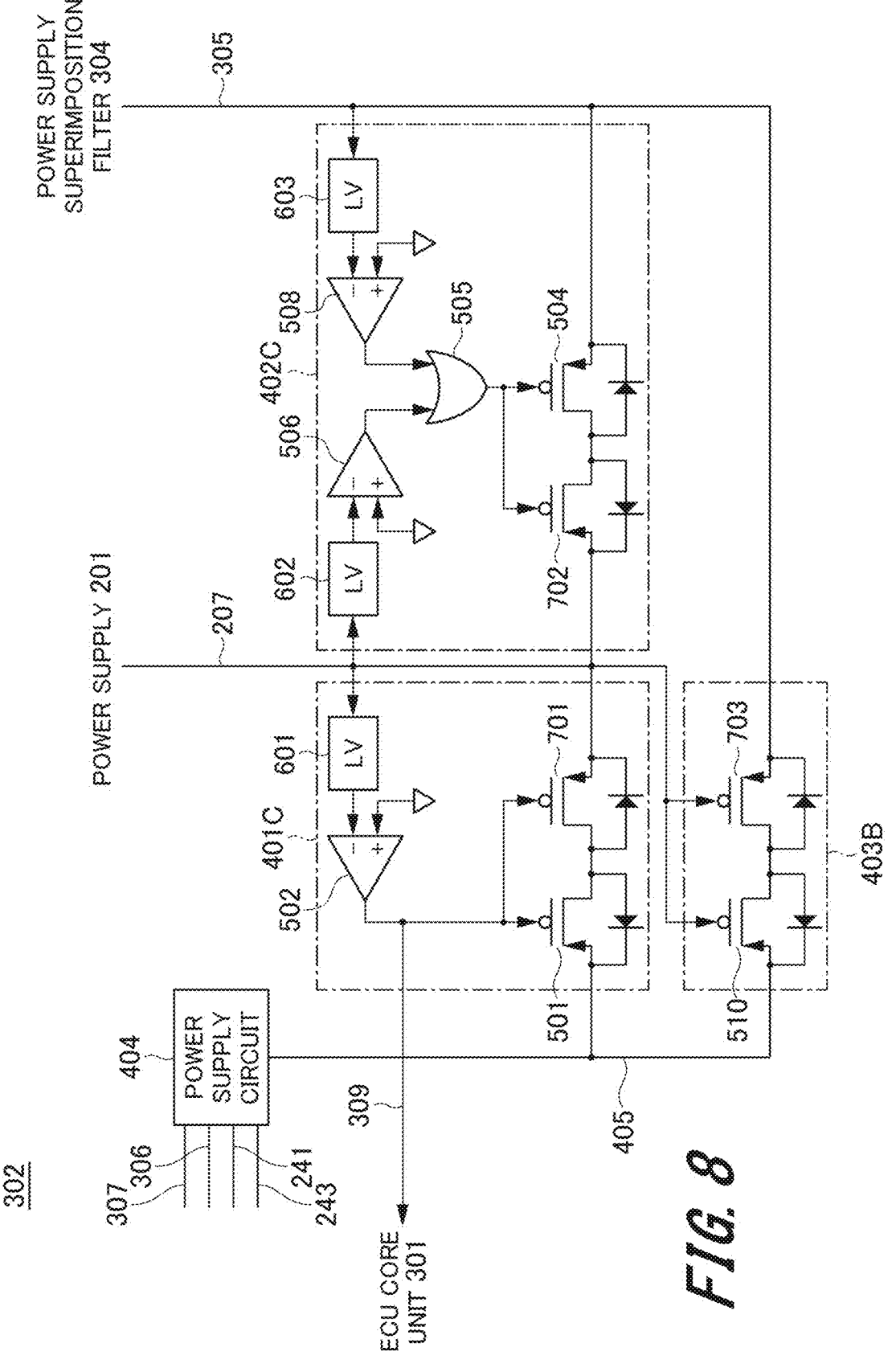
FIG. 8 is a circuit diagram illustrating a fourth example of an own power supply switch, an other load switch, and an other power supply switch constituting the power supply switcher according to the first embodiment of the present invention.

FIG. 8 is a circuit diagram illustrating the fourth example of an own power supply switch 401C, an other load switch 402C, and the other power supply switch 403B constituting the power supply switcher 302. The configuration of the power supply switcher 302 illustrated in FIG. 8 is different from the power supply switcher 302 of the second example illustrated in FIG. 6 in that each switch is provided with a countermeasure for preventing current leakage due to a ground fault in the power supply line 405, the power supply line 305, and the connection destination thereof. That is, in the fourth example of the power supply switcher 302, countermeasures similar to those in the third example are taken.

In the own power supply switch 401C, the MOSFET 501 having a drain-source direction opposite to that of the MOSFET 501 is added between the drain of the MOSFET 701 and the power supply harness 207, and the gate of the MOSFET 701 is connected to the output terminal of the comparator 502.

In the other load switch 402C, the MOSFET 504 having a drain-source direction opposite to that of the MOSFET 504 is added between the drain of the MOSFET 702 and the power supply harness 207, and the gate of the MOSFET 702 is connected to the output terminal of the OR circuit 505.

Similarly to the third example of the power supply switcher 302 illustrated in FIG. 7, in the MOSFET 701, the MOSFET 702, and the MOSFET 703, the orientations of the diodes are opposite to those of the original MOSFET 501, MOSFET 504, and MOSFET 510. The occurrence of current leakage can be prevented by the diodes of the MOSFETs 701 to 703.

Note that a circuit of each switch of the power supply switcher 302 may be configured using an N-type MOSFET as the MOSFET of each switch described above. In addition, other switching elements may be used instead of the MOSFET. Hereinafter, in the present specification, in a case where the own power supply switches 401 to 401C are not distinguished or collectively referred to, it may be simply described as the "own power supply switch 401". Similarly, the other load switches 402 to 402C may be referred to as "other load switch 402", and the other power supply switches 403 and 403B may be referred to as "other power supply switch 403".

As described above, the power supply system (power supply system 200 (ECU 203)) according to the first embodiment includes: the first control circuit (ECU core unit 301); the first power supply (power supply 201) that outputs the first voltage supplied to the first control circuit as the power supply voltage; the first switch circuit (own power supply switches 401 to 401C) that is connected to the first power supply (power supply harness 207) and the first control circuit and interrupts the power supply of the first voltage to the first control circuit; the second switch circuit (other load switches 402 to 402C) that is connected to the communication line (for example, communication line 216) used for communication between the first power supply and the second control circuit and interrupts the supply of the first voltage to the communication line; the second power supply (power supply 202) that outputs the second voltage supplied to the second control circuit as the power supply voltage; and the power supply switch circuit (other power supply switches 403 and 403B) that is connected to the first control circuit and the communication line and supplies the second voltage to the first control circuit via the communication line when the supply of the first voltage to the first control circuit is interrupted by the first switch circuit. Here, the power supply of the first voltage to the second control circuit and the power supply of the second voltage to the first control circuit are bidirectional power transmission using the communication line.

The first switch circuit interrupts the supply of the first voltage to the first control circuit in a case where the voltage drop of the first voltage is equal to or greater than the threshold, the second switch circuit interrupts the supply of the first voltage to the communication line in a case where the voltage drop of the first voltage is equal to or greater than the threshold, and the power supply switch circuit switches the supply source of the power supply voltage to the first control circuit from the first power supply to the second power supply.

According to the present embodiment having the above configuration, since the power supply source can be switched from the first power supply to the second power supply by bidirectional power transmission using the power supply redundancy technology, it is possible to realize power supply redundancy without increasing the number of power supply harnesses as in the related art.

In addition, in the power supply system (power supply system 200 (ECU 203)) according to the present embodiment, the first switch circuit (own power supply switches 401 to 401C) supplies the first voltage to the first control circuit in a case where the voltage drop of the first voltage is smaller than the threshold, the second switch circuit (other load switches 402 to 402C) supplies the first voltage to the communication line in a case where the voltage drop of the first voltage is smaller than the threshold and the voltage drop of the second voltage is equal to or greater than the threshold, and the power supply switch circuit (other power supply switches 403 and 403B) cuts off the communication line from the first control circuit.

According to the present embodiment having the above configuration, in a case where there is an abnormality in the second voltage of the second power supply, the first voltage can be supplied to the second control circuit by bidirectional power transmission using the power supply redundancy technology. Therefore, it is possible to realize power supply redundancy without increasing the number of power supply harnesses.

Second Embodiment

Next, a configuration of a power supply switcher included in an electronic control device (ECU) according to a second embodiment of the present invention will be described with reference to FIG. 9.

[Configuration of Power Supply Switcher]

Figure 9:
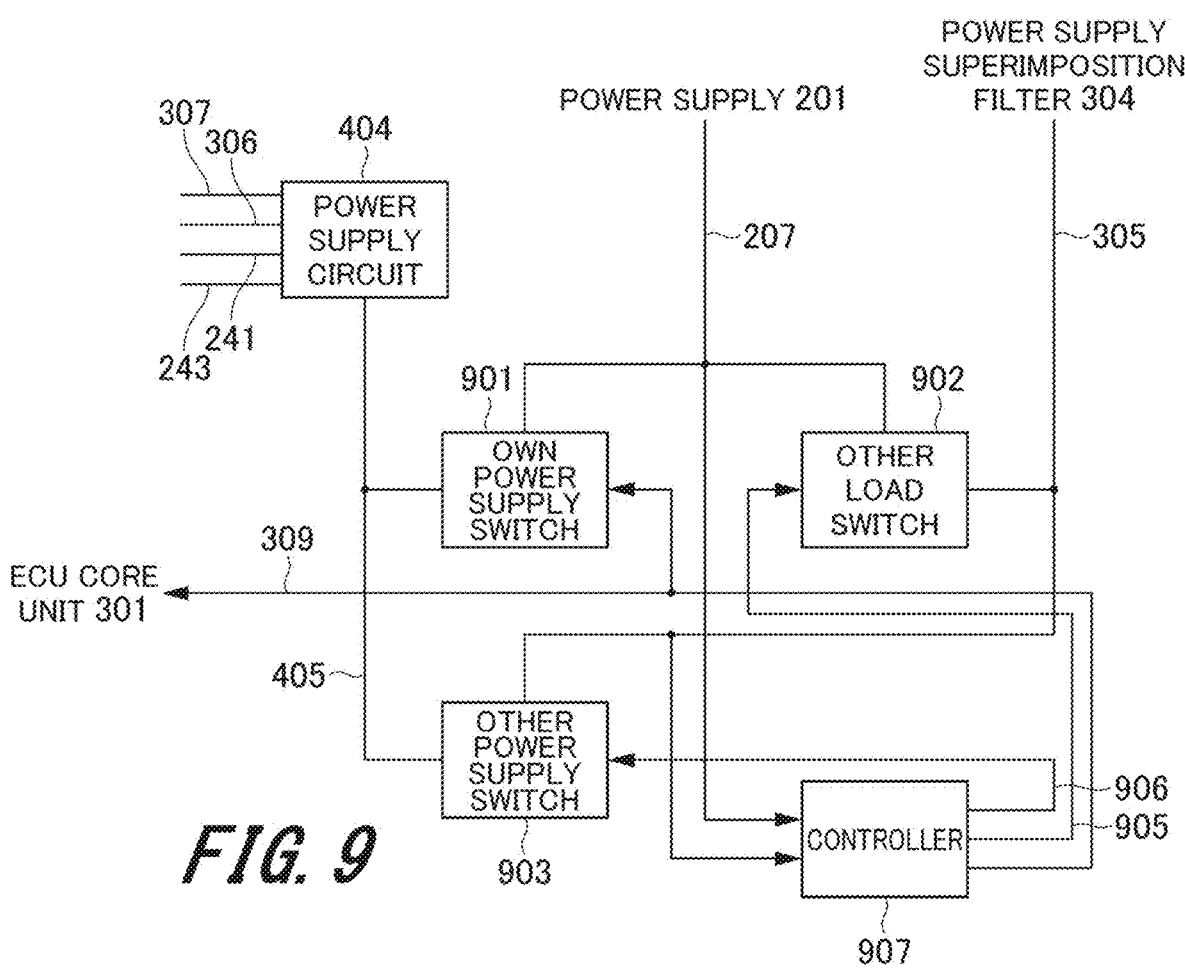
FIG. 9 is a block diagram illustrating a configuration example of a power supply switcher included in an electronic control device according to a second embodiment of the present invention.

FIG. 9 is a block diagram illustrating a configuration example of a power supply switcher 302A included in the ECU 203. The configuration of the power supply switcher 302A illustrated in FIG. 9 is different from the power supply switcher 302 illustrated in FIG. 4 in that determination control circuits (comparator, OR circuit, and the like in FIGS. 5 to 8) provided in the own power supply switch 401, the other load switch 402, and the other power supply switch 403 are integrated into one controller 907.

The power supply switcher 302A includes an own power supply switch 901, an other load switch 902, an other power supply switch 903, a controller 907, and a power supply circuit 404.

The own power supply switch 901, the other load switch 902, and the other power supply switch 903 are all configured using one MOSFET or two MOSFETs as illustrated in FIGS. 5 to 8. The own power supply switch 901, the other load switch 902, and the other power supply switch 903 have switching functions similar to those of the own power supply switch 401, the other load switch 402, and the other power supply switch 403 illustrated in FIG. 4.

The voltage from the power supply harness 207 and the voltage from the power supply line 305 are input to the controller 907. Then, the controller 907 controls the own power supply switch 901 via the communication line 309, the other load switch 902 via a control line 905, and the other power supply switch 903 via a control line 906 according to the voltage of the power supply harness 207 and the voltage of the power supply line 305.

In the own power supply switch 901 including one or two MOSFETs, a control signal from the controller 907 is input to the gate of each MOSFET via the communication line 309. In addition, in the other load switch 902 including one or two MOSFETs, the control signal from the controller 907 is input to the gate of each MOSFET through the control line 905. Further, in the other power supply switch 903 including one or two MOSFETs, a control signal from the controller 907 is input to the gate of each MOSFET via the control line 906.

[First Example of Controller]

Here, a first example of the controller 907 constituting the power supply switcher 302A in the present embodiment will be described with reference to FIG. 10.

Figure 10:
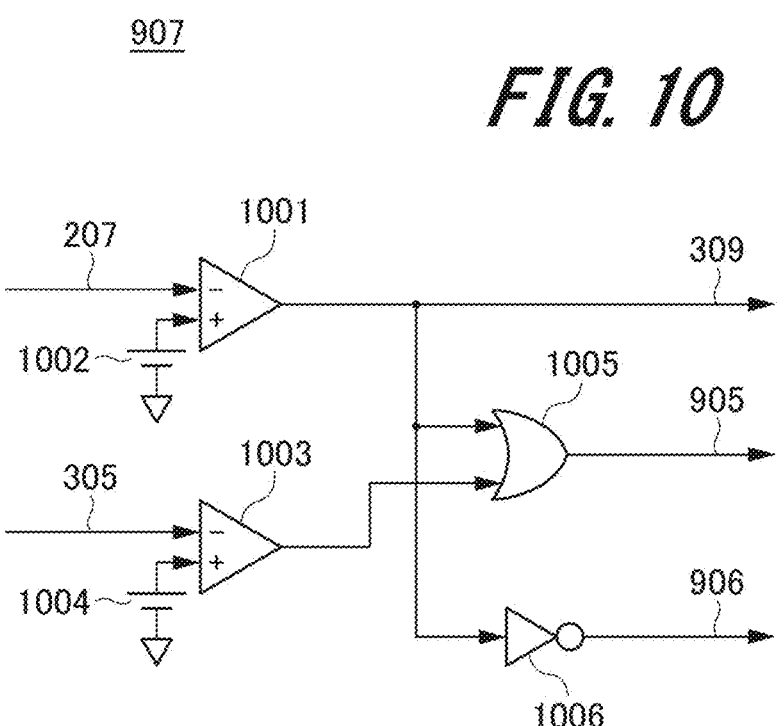
FIG. 10 is a circuit diagram illustrating a first example of a controller constituting the power supply switcher according to the second embodiment of the present invention.

FIG. 10 is a circuit diagram illustrating the first example of the controller 907 constituting the power supply switcher 302A.

The controller 907 includes a comparator 1001, a threshold voltage source 1002, a comparator 1003, a threshold voltage source 1004, an OR circuit 1005, and a NOT circuit 1006.

The comparator 1001 compares the voltage from the power supply harness 207 with the threshold voltage of the threshold voltage source 1002, and sets the output to the Low level when the voltage from the power supply harness 207 is equal to or higher than the threshold voltage, and conversely sets the output to the High level when the voltage from the power supply harness 207 is lower than the threshold voltage. The comparator 1001 outputs a signal corresponding to the comparison result to the communication line 309.

The comparator 1003 compares the voltage from the power supply line 305 with the threshold voltage of the threshold voltage source 1004, and sets the output to the Low level when the voltage from the power supply line 305 is equal to or higher than the threshold voltage, and conversely sets the output to the High level when the voltage from the power supply line 305 is lower than the threshold voltage.

The OR circuit 1005 sets the output to the High level when either the output voltage of the comparator 1001 or the output voltage of the comparator 1003 is at the High level, and sets the output to the Low level when both the output voltages are at the Low level. The OR circuit 1005 outputs a signal corresponding to the logic operation result to the control line 905 connected to the other load switch 902.

The NOT circuit 1006 inverts the output value of the comparator 1001 and outputs the inverted output value to the control line 906 connected to the other power supply switch 903. The NOT circuit 1006 outputs the High level when the output voltage of the comparator 1001 is at the Low level, and outputs the Low level when the output voltage of the comparator 1001 is at the High level.

[Second Example of Controller]

Next, a second example of the controller 907 constituting the power supply switcher 302A in the present embodiment will be described with reference to FIG. 11.

Figures 11, 12:
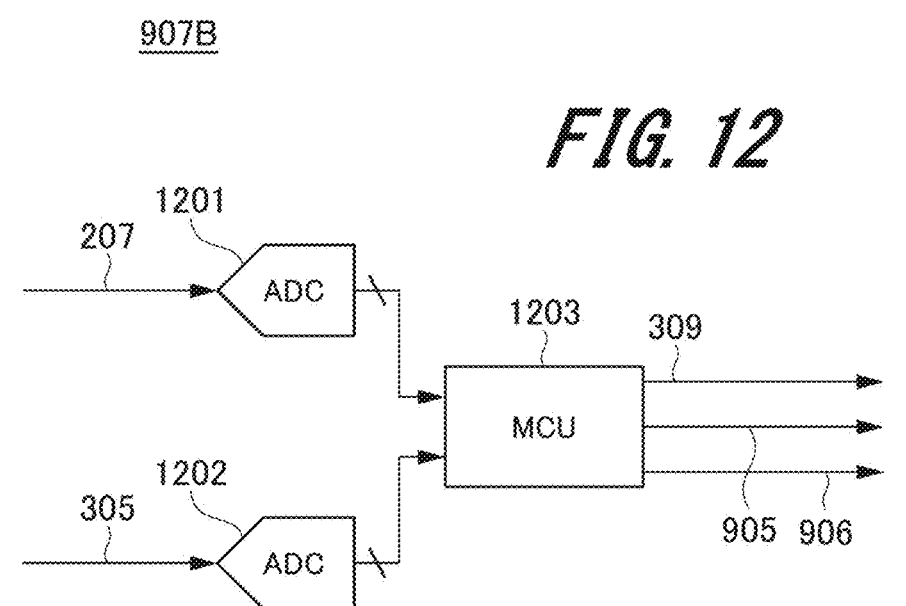
FIG. 11 is a circuit diagram illustrating a second example of a controller constituting the power supply switcher according to the second embodiment of the present invention.
FIG. 12 is a circuit diagram illustrating a third example of a controller constituting the power supply switcher according to the second embodiment of the present invention.

FIG. 11 is a circuit diagram illustrating the second example of the controller 907 constituting the power supply switcher 302A. The configuration of the controller 907A illustrated in FIG. 11 is different from the controller 907 of the first example illustrated in FIG. 10 in that a level shifter (denoted as "LV" in the drawing) is used instead of the threshold voltage source, and the operation is substantially the same as that of the first example.

The controller 907A includes a comparator 1001, a level shifter 1101, a comparator 1003, a level shifter 1102, an OR circuit 1005, and a NOT circuit 1006.

The level shifter 1101 shifts the voltage from the power supply harness 207 by a preset voltage and outputs the voltage to the comparator 1001. The comparator 1001 outputs the Low level when the output voltage of the level shifter 1101 is positive, and outputs the High level when the output voltage is negative.

The level shifter 1102 shifts the voltage from the power supply line 305 by a preset voltage and outputs the voltage to the comparator 1003. The comparator 1003 outputs the Low level when the output voltage of the level shifter 1102 is positive, and outputs the High level when the output voltage is negative.

The OR circuit 1005 outputs the High level when any of the output voltages of the comparator 1001 and the comparator 1003 is at the High level, and outputs the Low level when any of the output voltages is at the Low level. The NOT circuit 1006 inverts the output value of the comparator 1001. The NOT circuit 1006 outputs the signal at the High level when the signal is input at the Low level, and outputs the signal at the Low level when the signal is input at the high level.

[Third Example of Controller]

Next, a third example of the controller 907 constituting the power supply switcher 302A in the present embodiment will be described with reference to FIG. 12.

FIG. 12 is a circuit diagram illustrating the third example of the controller 907 constituting the power supply switcher 302A. A controller 907B illustrated in FIG. 12 includes an analog-to-digital converter (ADC) 1201, an ADC1202, and a microprocessor (denoted as "MCU" in the drawing) 1203. For example, a micro controller unit (MCU) can be used as the microprocessor 1203. In general, the MCU includes a processor, a memory such as a ROM and a RAM, an I/O, and the like. Since the controller 907B in the present embodiment can convert the voltages (analog signals) from the power supply harness 207 and the power supply line 305 into digital data, the control contents can be modified by programming.

The ADC1201 converts the value of the voltage from the power supply harness 207 into a digital value, and outputs the digital value to the microprocessor 1203. Furthermore, the ADC1202 converts the value of the voltage from the power supply line 305 into a digital value, and outputs the digital value to the microprocessor 1203.

The microprocessor 1203 receives the output of the ADC1201 and the output of the ADC1202. Then, when the output code (digital value of the voltage) of the ADC1201 is larger than the set code, the microprocessor 1203 sets the output to the communication line 309 to the Low level and sets the output to the control line 906 connected to the other power supply switch 903 to the High level. In addition, under other conditions, the microprocessor 1203 sets the output to the communication line 309 to the High level and sets the output to the control line 906 to the Low level. In addition, when either the output code of the ADC1201 or the output code of the ADC1202 is larger than the set code, the microprocessor 1203 sets the output to the control line 905 connected to the other load switch 902 to the High level, and sets the output to the control line 905 to the Low level under other conditions.

As described above, in the power supply switcher (power supply switcher 302A) of the power supply system (power supply system 200) according to the second embodiment, the determination control circuits (comparator, OR circuit, and the like in FIGS. 5 to 8) provided in the three switch circuits in the first embodiment are integrated into one controller (controllers 907 to 907B). Therefore, in the power supply system according to the present embodiment, the configuration of each switch circuit constituting the power supply switcher can be simplified.

Third Embodiment

Next, a configuration of a power supply system according to a third embodiment of the present invention will be described with reference to FIG. 13.

[Configuration of Power Supply System]

Figure 13:
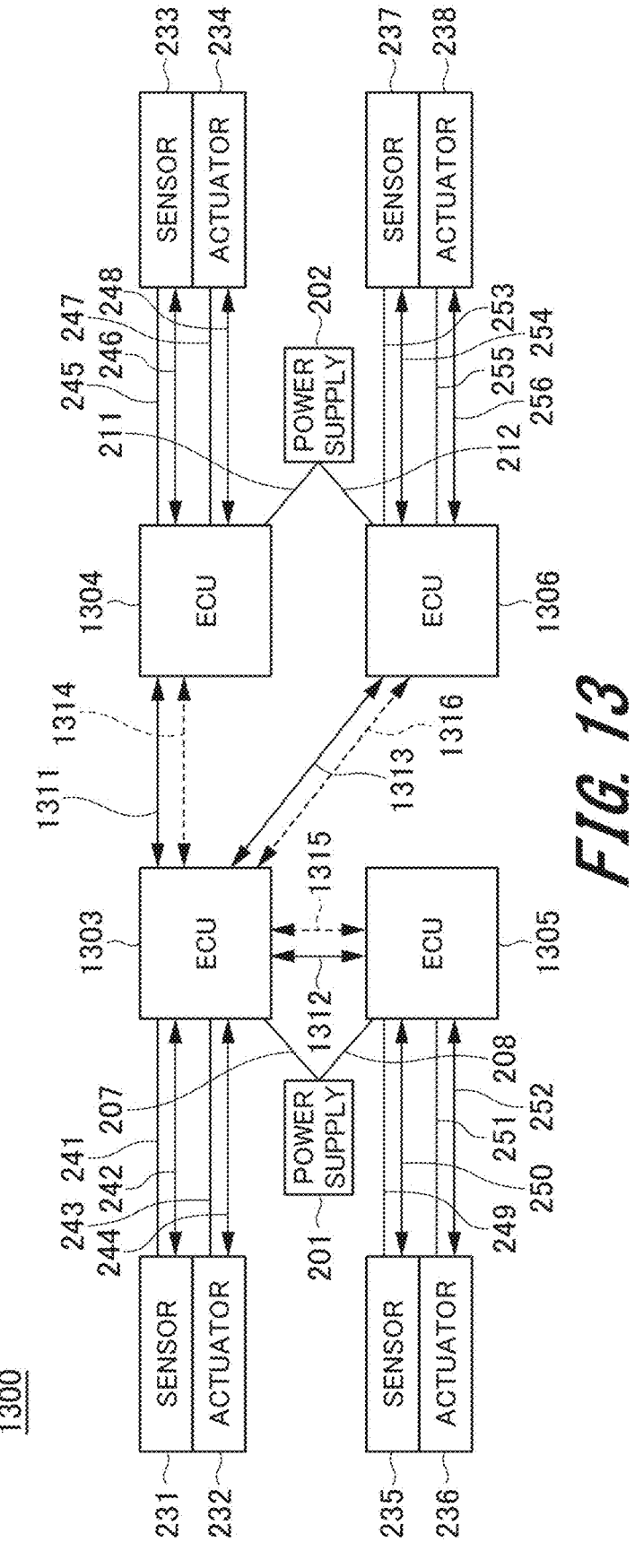
FIG. 13 is a system configuration diagram illustrating an example of power supply redundancy of a power supply system according to a third embodiment of the present invention.

FIG. 13 is a system configuration diagram illustrating an example of power supply redundancy of the power supply system according to the third embodiment. While the power supply system 200 (FIG. 2) according to the first and second embodiments has a ring-type architecture using four ECUs 203 to 206, a power supply system 1300 according to the present embodiment has a star-type architecture using four ECUs 1303 to 1306. Here, an example in which four ECUs are provided is illustrated, but the basic connection manner does not change even if the number of ECUs increases. In this architecture, a central ECU (ECU 1303) and other ECUs (ECUs 1304 to 1306) are connected by a communication line. The star-type architecture has an advantage that communication lines can be reduced.

The power supply system 1300 includes a power supply 201, a power supply 202, an ECU 1303, an ECU 1304, an ECU 1305, an ECU 1306, power supply harnesses 207 to 208, power supply harnesses 211 to 212, communication lines 1311 to 1313 indicated by solid lines, and communication lines 1314 to 1316 indicated by broken lines. The communication lines 1311 to 1313 indicated by solid lines are power supply superimposing communication lines. In addition, the communication lines 1314 to 1316 indicated by broken lines are communication lines for communication. However, the same power supply superimposing communication line as the communication lines 1311 to 1313 may be used as the communication lines 1314 to 1316.

The power supply 201 supplies power to the ECU 1303 via the power supply harness 207 and supplies power to the ECU 1305 via the power supply harness 208. In addition, the power supply 202 supplies power to the ECU 1304 via the power supply harness 211 and supplies power to the ECU 1306 via the power supply harness 212.

The ECU 1303 and the ECU 1304 can supply power to each other by superimposing power via the communication line 1311. In a case where the power supply 201 fails, the power of the power supply 202 is supplied from the ECU 1304 to the ECU 1303 via the communication line 1311. Conversely, when the power supply 202 fails, the power of the power supply 201 is supplied from the ECU 1303 to the ECU 1304 via the communication line 1311.

In addition, it similarly applies to power transmission between the ECU 1303 and the ECU 1306, and the ECU 1303 and the ECU 1306 can supply power to each other by superimposing power via the communication line 1313. In a case where the power supply 201 fails, the power of the power supply 202 is supplied from the ECU 1306 to the ECU 1303 via the communication line 1313. Conversely, when the power supply 202 fails, the power of the power supply 201 is supplied from the ECU 1303 to the ECU 1306 via the communication line 1313.

Regarding power transmission between the ECU 1303 and the ECU 1305, the ECU 1303 and the ECU 1305 can supply power to each other by superimposing power via the communication line 1312. In a case where the power supply 201 fails, the power of the power supply 202 is supplied from the ECU 1303 to the ECU 1305 via the communication line 1312.

The ECU 1303 performs redundant communication with the ECU 1304 via the communication line 1311 and the communication line 1314, performs redundant communication with the ECU 1305 via the communication line 1312 and the communication line 1315, performs redundant communication with the ECU 1306 via the communication line 1313 and the communication line 1316, and exchanges data. Furthermore, the ECU 1303 supplies power to the sensor 231 via the power supply line 241, and performs control and data transmission/reception via the communication line 242. Further, the ECU 1303 supplies power to the actuator 232 via the power supply line 243, and performs control and data transmission/reception via the communication line 244.

The ECU 1304 performs redundant communication with the ECU 1303 via the communication line 1311 and the communication line 1314 to exchange data. Furthermore, the ECU 1304 supplies power to the sensor 233 via the power supply line 245, and performs control and data transmission/reception via the communication line 246. Further, the ECU 1304 supplies power to the actuator 234 via the power supply line 247, and performs control and data transmission/reception via the communication line 248.

The ECU 1305 performs redundant communication with the ECU 1303 via the communication line 1312 and the communication line 1315 to exchange data. Furthermore, the ECU 1305 supplies power to the sensor 235 via the power supply line 249, and performs control and data transmission/reception via the communication line 250. Further, the ECU 1305 supplies power to the actuator 236 via the power supply line 251, and performs control and data transmission/reception via the communication line 252.

The ECU 1306 performs redundant communication with the ECU 1303 via the communication line 1313 and the communication line 1316 to exchange data. Furthermore, the ECU 1306 supplies power to the sensor 237 via the power supply line 253, and performs control and data transmission/reception via the communication line 254. Further, the ECU 1306 supplies power to the actuator 238 via the power supply line 255, and performs control and data transmission/reception via the communication line 256.

[Configuration of Electronic Control Device]

Next, a configuration of an electronic control device (ECU) included in the power supply system 1300 will be described with reference to FIG. 14.

Figure 14:
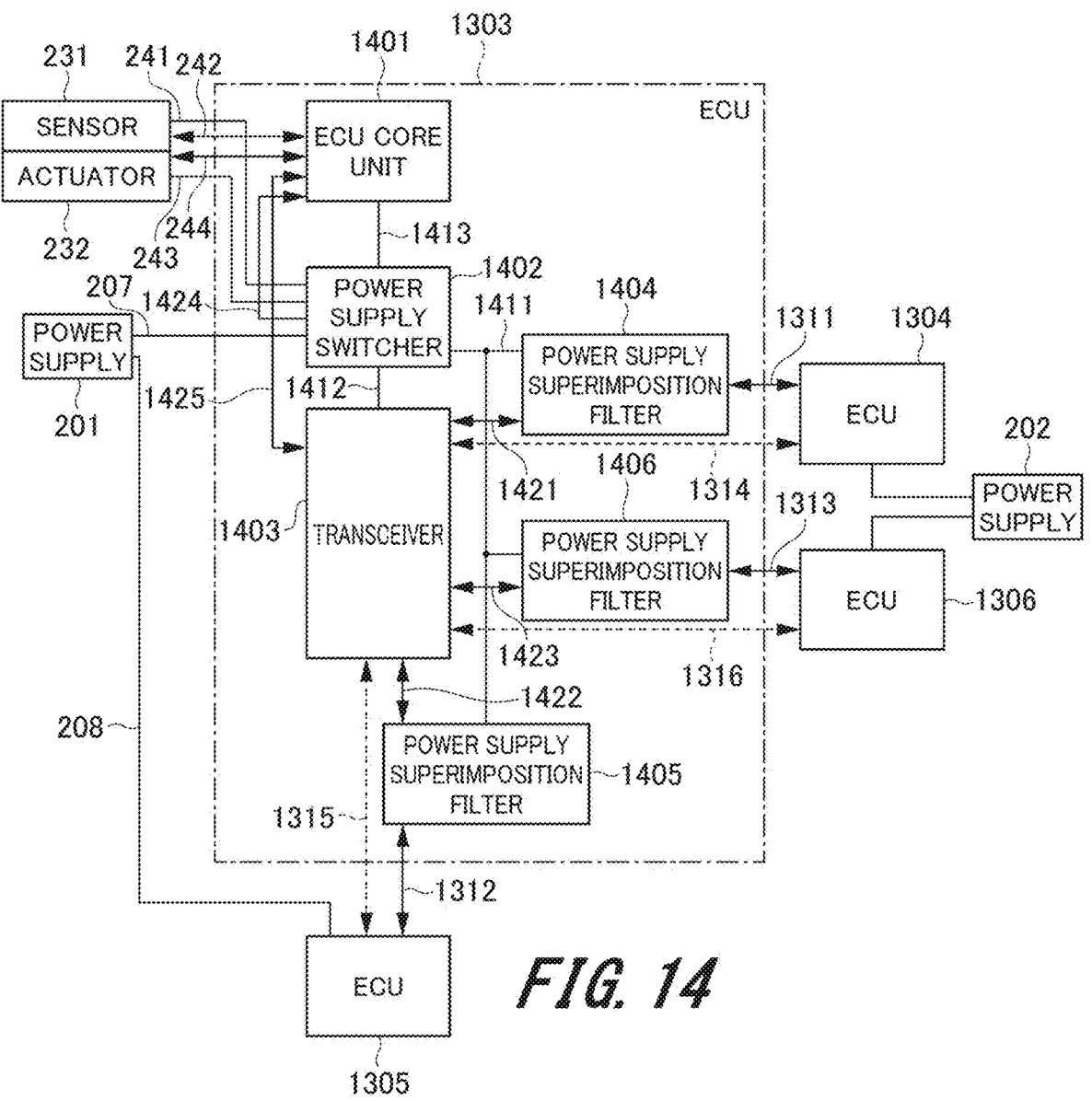
FIG. 14 is a block diagram illustrating a configuration example of an electronic control device included in the power supply system according to the third embodiment of the present invention.

FIG. 14 is a block diagram illustrating a configuration example of an electronic control device (ECU 1303) included in the power supply system 1300. Configurations of the ECU 1304, the ECU 1305, and the ECU 1306 are substantially similar to those of the ECU 1303 except that the number of communication lines is reduced. Note that the number of power supply superimposition filters of the target ECU may be reduced according to the number of other ECUs connected to the target ECU through the communication lines. For example, in each of the ECU 1304, the ECU 1305, and the ECU 1306, one power supply superimposition filter may be provided.

The ECU 1303 includes an ECU core unit 1401, a power supply switcher 1402, a transceiver 1403, a power supply superimposition filter 1404, a power supply superimposition filter 1405, and a power supply superimposition filter 1406. A basic function of each processing block is similar to that of the ECU core unit 301, the power supply switcher 302, the transceiver 303, and the power supply superimposition filter 304 illustrated in FIG. 3.

The power supply superimposition filter 1404 is connected to the ECU 1304 via the communication line 1311, and exchanges a communication signal or a communication signal on which power is superimposed. In addition, the power supply superimposition filter 1404 is connected to the power supply switcher 1402 via a power supply line 1411 and is connected to the transceiver 1403 via a communication line 1421. In addition, the power supply superimposition filter 1404 is connected to the power supply superimposition filter 1405 and the power supply superimposition filter 1406 via the power supply line 1411. In the power supply superimposition filter 1404, only DC power and power having a frequency near DC pass between the communication line 1311 and the power supply line 1411, and only a high-frequency communication signal passes between the communication line 1311 and the communication line 1421.

The power supply superimposition filter 1405 is connected to the ECU 1305 via the communication line 1312, and exchanges a communication signal or a communication signal on which power is superimposed. In addition, the power supply superimposition filter 1405 is connected to the power supply switcher 1402 via the power supply line 1411 and is connected to the transceiver 1403 via a communication line 1422. In addition, the power supply superimposition filter 1405 is connected to the power supply superimposition filter 1404 and the power supply superimposition filter 1406 via the power supply line 1411. In the power supply superimposition filter 1405, only DC power and power having a frequency near DC pass between the communication line 1312 and the power supply line 1411, and only a high-frequency communication signal passes between the communication line 1312 and the communication line 1422.

The power supply superimposition filter 1406 is connected to the ECU 1306 via the communication line 1313, and exchanges a communication signal or a communication signal on which power is superimposed. In addition, the power supply superimposition filter 1406 is connected to the power supply switcher 1402 via the power supply line 1411 and is connected to the transceiver 1403 via a communication line 1423. In addition, the power supply superimposition filter 1406 is connected to the power supply superimposition filter 1404 and the power supply superimposition filter 1405 via the power supply line 1411. In the power supply superimposition filter 1406, only DC power and power having a frequency near DC pass between the communication line 1313 and the power supply line 1411, and only a high-frequency communication signal passes between the communication line 1313 and the communication line 1423.

The power supply switcher 1402 receives the power of the power supply 201 supplied via the power supply harness 207 and the power of the power supply 202 supplied via the power supply line 1411. Then, the power supply switcher 1402 internally monitors the voltage passing through the power supply harness 207 and the voltage passing through the power supply line 1411, and determines and switches which voltage is connected to the output. Accordingly, the power supply switcher 1402 supplies power to the ECU core unit 1401 via a power supply line 1413, to the transceiver 1403 via a power supply line 1412, to the sensor 231 via the power supply line 241, and to the actuator 232 via the power supply line 243.

In a case where the power supply 201 is normal, the power supply switcher 1402 supplies power from the power supply harness 207 to the ECU core unit 1401, the transceiver 1403, the sensor 231, and the actuator 232. On the other hand, in a case where the power supply 201 has failed and the power supply 202 is normal, the power supply switcher 1402 supplies the power transmitted through the power supply line 1411 to the ECU core unit 1401, the transceiver 1403, the sensor 231, and the actuator 232. In addition, since the power supply switcher 1402 can obtain the power supply failure information regarding the power supply 201, the power supply failure information can be transmitted to the ECU core unit 1401 via a communication line 1424 to share the power supply failure information with other ECUs.

The transceiver 1403 communicates with the ECU 1304 via the communication line 1311 via the communication line 1421 and the power supply superimposition filter 1404 and the communication line 1314. In addition, the transceiver 1403 communicates with the ECU 1305 via the communication line 1312 via the communication line 1422 and the power supply superimposition filter 1405 and the communication line 1315. In addition, the transceiver 1403 communicates with the ECU 1306 via the communication line 1313 via the communication line 1423 and the power supply superimposition filter 1406 and the communication line 1316. Then, the transceiver 1403 exchanges a transmission signal and a reception signal for another ECU with the ECU core unit 1401 via a communication line 1425.

The ECU core unit 1401 controls the transceiver 1403 via the communication line 1425, and exchanges data with the ECU 1304, the ECU 1305, and the ECU 1306 (FIG. 13) via the transceiver 1403. In addition, the ECU core unit 1401 performs control and data transmission/reception with respect to the sensor 231 and the actuator 232, and performs data processing.

As described above, according to the power supply system (power supply system 1300) according to the third embodiment, it is possible to reduce the number of communication lines as compared with the first embodiment since it is a star-type network in addition to effects similar to those of the first embodiment.

Fourth Embodiment

Next, a configuration of a power supply system according to a fourth embodiment of the present invention will be described with reference to FIG. 15.

[Configuration of Power Supply System]

Figure 15:
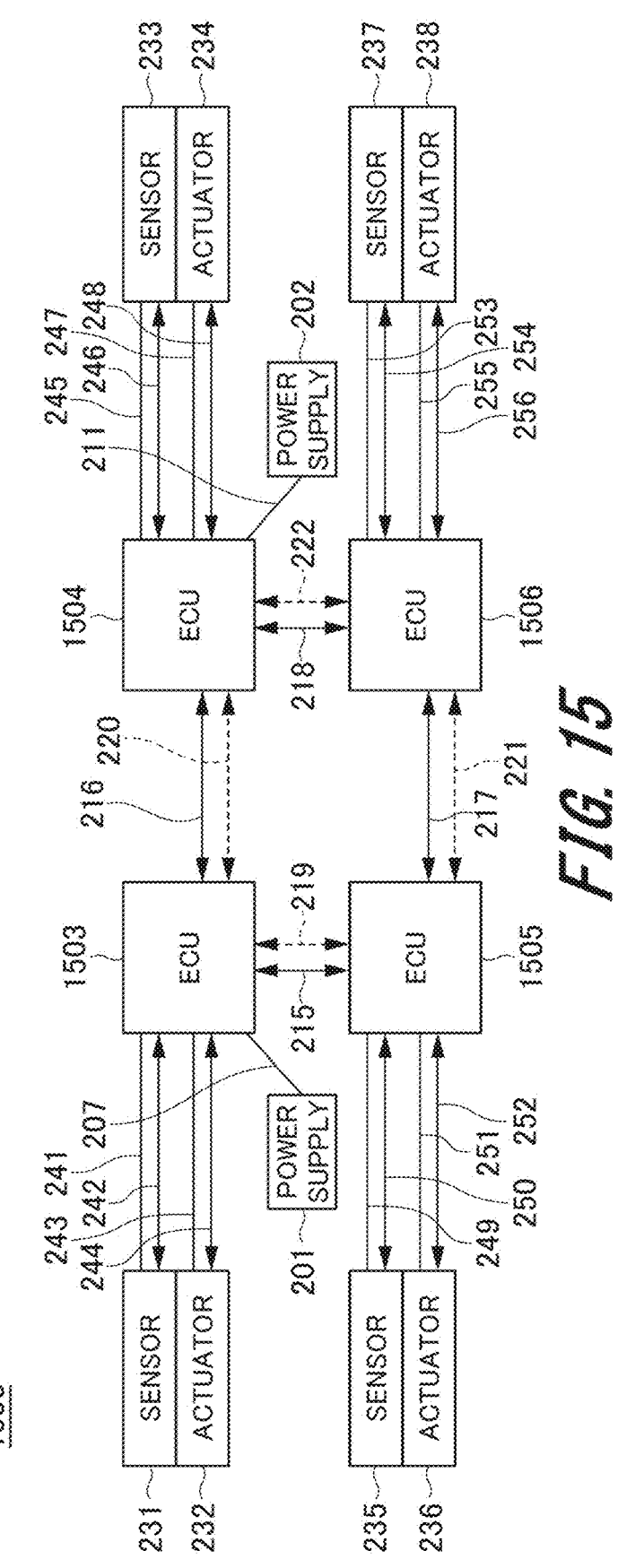
FIG. 15 is a system configuration diagram illustrating an example of power supply redundancy of a power supply system according to a fourth embodiment of the present invention.

FIG. 15 is a system configuration diagram illustrating an example of power supply redundancy of the power supply system according to the fourth embodiment. A power supply system 1500 illustrated in FIG. 15 uses a ring-type network architecture similarly to the power supply system 200 (FIG. 2) according to the first embodiment, and has a system in which the power supply harnesses are reduced as compared with the first embodiment, and power is supplied to the target ECU by power supply superimposition even when the power supply is normal.

The power supply 201 supplies power to an ECU 1503 via the power supply harness 207. In addition, the power supply 202 supplies power to an ECU 1504 via the power supply harness 211. That is, there is no power supply harness between the power supply 201 and an ECU 1505 and between the power supply 202 and an ECU 1506.

The ECU 1503 and the ECU 1504 can supply power to each other by superimposing power via the communication line 216. In a case where the power supply 201 fails, the power of the power supply 202 is supplied from the ECU 1504 to the ECU 1503 via the communication line 216. Conversely, when the power supply 202 fails, the power of the power supply 201 is supplied from the ECU 1503 to the ECU 1504 via the communication line 216.

The power of the ECU 1505 is supplied by superimposing the power of the power supply 201 via the ECU 1503 through the communication line 215. Similarly, the power of the ECU 1506 is supplied by superimposing the power of the power supply 202 via the ECU 1504 via the communication line 218.

The ECU 1505 and the ECU 1506 can supply power to each other by superimposing power via the communication line 217. In a case where the power supply 201 fails, the power of the power supply 202 is supplied to the ECU 1505 via the communication line 217 via the ECU 1504 and the ECU 1506. Conversely, when the power supply 202 fails, the power of the power supply 201 is supplied to the ECU 1506 via the communication line 217 via the ECU 1503 and the ECU 1505.

The ECU 1503 performs redundant communication with the ECU 1504 via the communication line 216 and the communication line 220, performs redundant communication with the ECU 1505 via the communication line 215 and the communication line 219, and exchanges data. Furthermore, the ECU 1503 supplies power to the sensor 231 via the power supply line 241, and performs control and data transmission/reception via the communication line 242. Further, the ECU 1503 supplies power to the actuator 232 via the power supply line 243, and performs control and data transmission/reception via the communication line 244.

The ECU 1504 performs redundant communication with the ECU 1503 via the communication line 216 and the communication line 220, performs redundant communication with the ECU 1506 via the communication line 218 and the communication line 222, and exchanges data. Furthermore, the ECU 1504 supplies power to the sensor 233 via the power supply line 245, and performs control and data transmission/reception via the communication line 246. Further, the ECU 1504 supplies power to the actuator 234 via the power supply line 247, and performs control and data transmission/reception via the communication line 248.

The ECU 1505 performs redundant communication with the ECU 1503 via the communication line 215 and the communication line 219, performs redundant communication with the ECU 1506 via the communication line 217 and the communication line 221, and exchanges data. Furthermore, the ECU 1505 supplies power to the sensor 235 via the power supply line 249, and performs control and data transmission/reception via the communication line 250. Further, the ECU 1505 supplies power to the actuator 236 via the power supply line 251, and performs control and data transmission/reception via the communication line 252.

The ECU 1506 performs redundant communication with the ECU 1504 via the communication line 218 and the communication line 222, performs redundant communication with the ECU 1505 via the communication line 217 and the communication line 221, and exchanges data. Furthermore, the ECU 1506 supplies power to the sensor 237 via the power supply line 253, and performs control and data transmission/reception via the communication line 254. Further, the ECU 1506 supplies power to the actuator 238 via the power supply line 255, and performs control and data transmission/reception via the communication line 256.

[Configuration of Electronic Control Device]

Next, a configuration of an electronic control device (ECU) included in the power supply system 1500 will be described with reference to FIG. 16.

Figure 16:
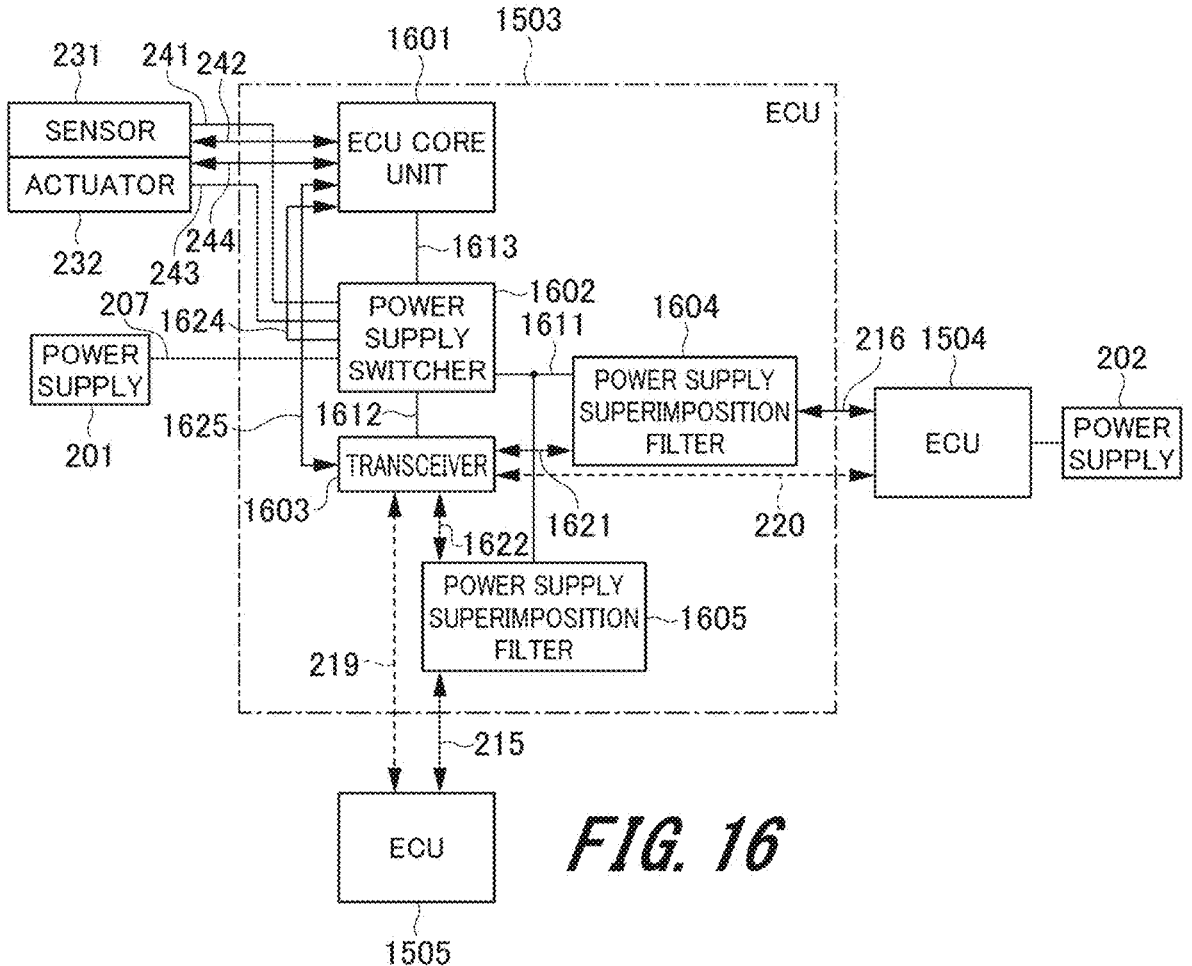
FIG. 16 is a block diagram illustrating a configuration example of an electronic control device included in the power supply system according to the fourth embodiment of the present invention.

FIG. 16 is a block diagram illustrating a configuration example of an electronic control device (ECU 1503) included in the power supply system 1500. The ECU 1504 has a configuration similar to the ECU 1503.

The ECU 1503 includes an ECU core unit 1601, a power supply switcher 1602, a transceiver 1603, a power supply superimposition filter 1604, and a power supply superimposition filter 1605. A basic function of each processing block is similar to that of the ECU core unit 301, the power supply switcher 302, the transceiver 303, and the power supply superimposition filter 304 illustrated in FIG. 3.

The power supply superimposition filter 1604 is connected to the ECU 1504 via the communication line 216, and exchanges a communication signal or a communication signal on which power is superimposed. In addition, the power supply superimposition filter 1604 is connected to the power supply switcher 1602 via a power supply line 1611 and is connected to the transceiver 1603 via a communication line 1621. In addition, the power supply superimposition filter 1604 is connected to the power supply superimposition filter 1605 via the power supply line 1611. In the power supply superimposition filter 1604, only DC power and power having a frequency near DC pass between the communication line 216 and the power supply line 1611, and only a high-frequency communication signal passes between the communication line 216 and the communication line 1621.

The power supply superimposition filter 1605 is connected to the ECU 1505 via the communication line 215, and exchanges a communication signal or a communication signal on which power is superimposed. In addition, the power supply superimposition filter 1605 is connected to the power supply switcher 1602 via the power supply line 1611 and is connected to the transceiver 1603 via a communication line 1622. In addition, the power supply superimposition filter 1605 is connected to the power supply superimposition filter 1604 via the power supply line 1611. In the power supply superimposition filter 1605, only DC power and power having a frequency near DC pass between the communication line 215 and the power supply line 1611, and only a high-frequency communication signal passes between the communication line 215 and the communication line 1622.

The power supply switcher 1602 receives the power of the power supply 201 supplied via the power supply harness 207 and the power of the power supply 202 supplied via the power supply line 1611. The power supply switcher 1602 internally monitors the voltage passing through the power supply harness 207 and the voltage passing through the power supply line 1611, and determines and switches which voltage is connected to the output. Accordingly, the power supply switcher 1602 supplies power to the ECU core unit 1601 via a power supply line 1613, to the transceiver 1603 via a power supply line 1612, to the sensor 231 via the power supply line 241, and to the actuator 232 via the power supply line 243.

In a case where the power supply 201 is normal, the power supply switcher 1602 supplies power from the power supply harness 207 to the ECU core unit 1601, the transceiver 1603, the sensor 231, and the actuator 232. On the other hand, in a case where the power supply 201 has failed and the power supply 202 is normal, the power supply switcher 1602 supplies the power transmitted through the power supply line 1611 to the ECU core unit 1601, the transceiver 1603, the sensor 231, and the actuator 232. In addition, since the power supply switcher 1602 can obtain the power supply failure information regarding the power supply 201, the power supply failure information can be transmitted to the ECU core unit 1601 via a communication line 1624 to share the power supply failure information with other ECUS.

The transceiver 1603 communicates with the ECU 1504 via the communication line 216 via the communication line 1621 and the power supply superimposition filter 1604 and the communication line 220. In addition, the transceiver 1603 communicates with the ECU 1505 via the communication line 215 via the communication line 1622 and the power supply superimposition filter 1605 and the communication line 219. Then, the transceiver 1603 exchanges a transmission signal and a reception signal for another ECU with the ECU core unit 1601 via a communication line 1625.

The ECU core unit 1601 controls the transceiver 1603 via the communication line 1625, and exchanges data with the ECU 1504, the ECU 1505, and the ECU 1506 (FIG. 15) via the transceiver 1603. In addition, the ECU core unit 1601 performs control and data transmission/reception with respect to the sensor 231 and the actuator 232, and performs data processing.

[Configuration of Another Electronic Control Device]

Next, a configuration of another electronic control device (ECU) included in the power supply system 1500 will be described with reference to FIG. 17.

Figure 17:
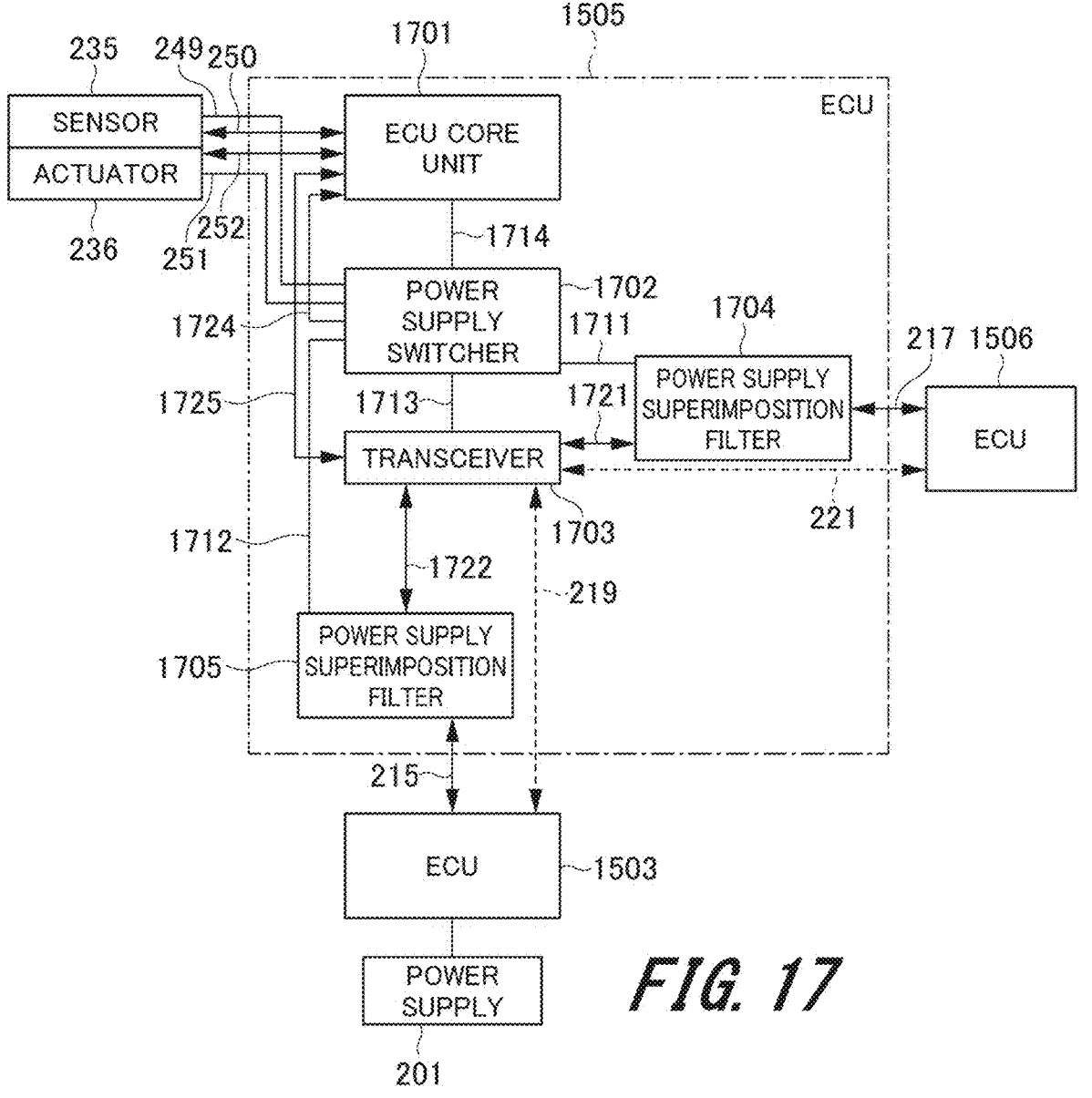
FIG. 17 is a block diagram illustrating a configuration example of another electronic control device included in the power supply system according to the fourth embodiment of the present invention.

FIG. 17 is a block diagram illustrating a configuration example of another electronic control device (ECU 1505) included in the power supply system 1500. The ECU 1506 has a configuration similar to the ECU 1505.

The ECU 1505 includes an ECU core unit 1701, a power supply switcher 1702, a transceiver 1703, a power supply superimposition filter 1704, and a power supply superimposition filter 1705. A basic function of each processing block is similar to that of the ECU core unit 301, the power supply switcher 302, the transceiver 303, and the power supply superimposition filter 304 illustrated in FIG. 3. The connection of the ECU 1505 is slightly different from that of the ECU 1503 by the amount that the power supply harness is not connected.

The power supply superimposition filter 1704 is connected to the ECU 1506 via the communication line 217, and exchanges a communication signal or a communication signal on which power is superimposed. In addition, the power supply superimposition filter 1704 is connected to the power supply switcher 1702 via a power supply line 1711 and is connected to the transceiver 1703 via a communication line 1721. In the power supply superimposition filter 1704, only DC power and power having a frequency near DC pass between the communication line 217 and the power supply line 1711, and only a high-frequency communication signal passes between the communication line 217 and the communication line 1721.

The power supply superimposition filter 1705 is connected to the ECU 1503 via the communication line 215, and exchanges a communication signal or a communication signal on which power is superimposed. In addition, the power supply superimposition filter 1705 is connected to the power supply switcher 1702 via a power supply line 1712 and is connected to the transceiver 1703 via a communication line 1722. In the power supply superimposition filter 1705, only DC power and power having a frequency near DC pass between the communication line 215 and the power supply line 1712, and only a high-frequency communication signal passes between the communication line 215 and the communication line 1722.

The power supply switcher 1702 receives the power of the power supply 201 supplied via the power supply line 1712 and the power of the power supply 202 supplied via the power supply line 1711. The power supply switcher 1702 internally monitors the voltage passing through the power supply line 1712 and the voltage passing through the power supply line 1711, and determines and switches which voltage is connected to the output. Accordingly, the power supply switcher 1702 supplies power to the ECU core unit 1701 via a power supply line 1714, to the transceiver 1703 via a power supply line 1713, to the sensor 235 via the power supply line 249, and to the actuator 236 via the power supply line 251.

In a case where the power supply 201 is normal, the power supply switcher 1702 supplies power from the power supply line 1712 to the ECU core unit 1701, the transceiver 1703, the sensor 235, and the actuator 236. On the other hand, in a case where the power supply 201 has failed and the power supply 202 is normal, the power supply switcher 1702 supplies the power transmitted through the power supply line 1711 to the ECU core unit 1701, the transceiver 1703, the sensor 235, and the actuator 236. In addition, since the power supply switcher 1702 can obtain the power supply failure information regarding the power supply 201, the power supply failure information can be transmitted to the ECU core unit 1701 via a communication line 1724 to share the power supply failure information with other ECUs.

The transceiver 1703 communicates with the ECU 1506 via the communication line 217 via the communication line 1721 and the power supply superimposition filter 1704 and the communication line 221. In addition, the transceiver 1703 communicates with the ECU 1503 via the communication line 215 via the communication line 1722 and the power supply superimposition filter 1705 and the communication line 219. Then, the transceiver 1703 exchanges a transmission signal and a reception signal for another ECU with the ECU core unit 1701 via a communication line 1725.

The ECU core unit 1701 controls the transceiver 1703 via the communication line 1725, and exchanges data with the ECU 1503, the ECU 1504, and the ECU 1506 (FIG. 15) via the transceiver 1703. In addition, the ECU core unit 1701 performs control and data transmission/reception with respect to the sensor 235 and the actuator 236, and performs data processing.

Note that the present invention can also be applied to an architecture including an integrated ECU that can receive power supply from the power supply 201 and the power supply 202 and integrally controls a plurality of ECUs.

Furthermore, the present invention is not limited to the above-described embodiments, and it is obvious that various other application examples and modifications can be taken without departing from the gist of the present invention described in the claims. For example, the above-described embodiments have been described in detail and specifically in order to explain the present invention in an easy-to-understand manner, and are not necessarily limited to those including all the described components. In addition, a part of the configuration of one embodiment can be replaced with a component of another embodiment. In addition, components of other embodiments can be added to the configuration of one embodiment. In addition, it is also possible to add, replace, or delete other components for a part of the configuration of each embodiment.

In addition, some or all of the above-described configurations, functions, processing units, and the like may be realized by hardware, for example, by designing with an integrated circuit. A processor device in a broad sense such as a field programmable gate array (FPGA) or an application specific integrated circuit (ASIC) may be used as the hardware.

In addition, in the above-described embodiment, control lines and information lines considered to be necessary for description are illustrated, and not all control lines and information lines are necessarily illustrated in terms of products. In practice, almost all the components may be considered to be connected to each other.

REFERENCE SIGNS LIST

200 Power supply system
201, 202 Power supply
203 to 206 ECU
207, 208, 211, 212 Power supply harness
301 ECU core unit
302 Power supply switcher
303 Transceiver
304 Power supply superimposition filter
401 Own power supply switch
402 Other load switch
403 Other power supply switch

The invention claimed is:

1. A power supply system comprising:
   a first control circuit;
   a first power supply that outputs a first voltage supplied to the first control circuit as a power supply voltage;
   a first switch circuit that is connected to the first power supply and the first control circuit and interrupts power supply of the first voltage to the first control circuit;
   a second switch circuit that is connected to a communication line used for communication between the first power supply and a second control circuit and interrupts supply of the first voltage to the communication line;

a second power supply that outputs a second voltage supplied to the second control circuit as a power supply voltage; and a power supply switch circuit that is connected to the first control circuit and the communication line and supplies the second voltage to the first control circuit via the communication line when the supply of the first voltage to the first control circuit is interrupted by the first switch circuit, wherein power supply of the first voltage to the second control circuit and power supply of the second voltage to the first control circuit are bidirectional power transmission using the communication line, the first switch circuit interrupts the supply of the first voltage to the first control circuit in a case where a voltage drop of the first voltage is equal to or greater than a threshold, the second switch circuit interrupts the supply of the first voltage to the communication line in a case where the voltage drop of the first voltage is equal to or greater than a threshold, and the power supply switch circuit switches a supply source of the power supply voltage to the first control circuit from the first power supply to the second power supply.

2. The power supply system according to claim 1, wherein the first switch circuit supplies the first voltage to the first control circuit in a case where the voltage drop of the first voltage is smaller than a threshold, the second switch circuit supplies the first voltage to the communication line in a case where the voltage drop of the first voltage is smaller than a threshold and a voltage drop of the second voltage is equal to or greater than a threshold, and the power supply switch circuit cuts off the communication line from the first control circuit.

3. The power supply system according to claim 1, wherein the first switch circuit includes a first switching element that energizes between the first power supply and the first control circuit when the voltage drop of the first voltage is smaller than a threshold, and a switching element that is connected between the first power supply and the first control circuit in series with the first switching element and having opposite polarity, the second switch circuit includes a second switching element that energizes between the first power supply and the communication line when a voltage drop of both the first voltage and the second voltage is smaller than a threshold, and a switching element connected between the first power supply and the communication line in series with the second switching element and having opposite polarity, and the power supply switch circuit includes a third switching element that energizes between the first control circuit and the communication line when the voltage drop of the first voltage is smaller than a threshold, and a switching element connected between the first control circuit and the communication line in series with the third switching element and having opposite polarity.

4. The power supply system according to claim 1, wherein when the power supply of the first voltage to the first control circuit is interrupted, the first control circuit notifies an external device that the first power supply is abnormal.

5. An electronic control device comprising:

a first control circuit to which a first voltage is supplied from a first power supply as a power supply voltage;

a first switch circuit that is connected to the first power supply and the first control circuit and interrupts power supply of the first voltage to the first control circuit;

a second switch circuit that is connected to the first power supply and a communication line used for communication with a second control circuit to which a second voltage is supplied from a second power supply as a power supply voltage, the second switch circuit interrupting supply of the first voltage to the communication line; and a power supply switch circuit that is connected to the first control circuit and the communication line and supplies the second voltage to the first control circuit via the communication line when the supply of the first voltage to the first control circuit is interrupted by the first switch circuit, wherein power supply of the first voltage to the second control circuit and power supply of the second voltage to the first control circuit are bidirectional power transmission using the communication line, the first switch circuit interrupts the supply of the first voltage to the first control circuit in a case where a voltage drop of the first voltage is equal to or greater than a threshold, the second switch circuit interrupts the supply of the first voltage to the communication line in a case where the voltage drop of the first voltage is equal to or greater than a threshold, and the power supply switch circuit switches a supply source of the power supply voltage to the first control circuit from the first power supply to the second power supply.

* * * * *